(12) United States Patent
Itani

(10) Patent No.: US 8,677,122 B1
(45) Date of Patent: *Mar. 18, 2014

(54) METHOD FOR PROCESSING A SECURE SYSTEM MANAGER

(71) Applicant: Atheer, Inc., Mountain View, CA (US)

(72) Inventor: Sleiman Itani, East Palo Alto, CA (US)

(73) Assignee: Atheer, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/019,033

(22) Filed: Sep. 5, 2013

Related U.S. Application Data

(63) Continuation of application No. 13/773,435, filed on Feb. 21, 2013, now Pat. No. 8,613,090.

(51) Int. Cl.
*G06F 21/00* (2013.01)

(52) U.S. Cl.
USPC ........................................................ 713/164

(58) Field of Classification Search
USPC ........................... 713/165, 164, 2; 726/22, 23
See application file for complete search history.

(56) References Cited

U.S. PATENT DOCUMENTS

| | | | | |
|---|---|---|---|---|
| 7,886,098 B2 * | 2/2011 | Kershaw et al. | ............... | 710/110 |
| 7,917,753 B2 * | 3/2011 | Asal et al. | ....................... | 713/166 |
| 7,949,866 B2 * | 5/2011 | Watt et al. | ...................... | 713/100 |
| 8,127,131 B2 * | 2/2012 | Gehrmann | ..................... | 713/164 |
| 2003/0140245 A1 * | 7/2003 | Dahan et al. | ................... | 713/200 |
| 2008/0109655 A1 * | 5/2008 | Wilson et al. | .................. | 713/164 |
| 2010/0293357 A1 * | 11/2010 | Park et al. | ...................... | 712/205 |

OTHER PUBLICATIONS

Co-pending U.S. Appl. No. 13/773,435 by Itani, S., filed Feb. 21, 2013.
Co-pending U.S. Appl. No. 13/773,465 by Itani, S., filed Feb. 21, 2013.
Non-Final Office Action mailed Jun. 12, 2013, for U.S. Appl. No. 13/773,435 by Itan, S., filed Feb. 21, 2013.
Notice of Allowance mailed Oct. 9, 2013, for U.S. Appl. No. 13/773,435 by Itani, S., filed Feb. 21, 2013.

* cited by examiner

*Primary Examiner* — Ali Abyaneh
(74) *Attorney, Agent, or Firm* — Perkins Coie, LLP

(57) ABSTRACT

Method and apparatus for secure processing. The method includes detecting communication among secure and non-secure data entities, prohibiting execution of non-secure executable instructions on secure data entities unless the non-secure executable instructions are recorded in a permitted instruction record, and prohibiting execution of non-secure executable instructions if the non-secure executable instructions are recorded in a prohibited instruction record. The apparatus includes a processor, at least one non-secure data entity, and secure data entities including: a communication monitor adapted to detect communication among secure and non-secure data entities; a permitted instruction record; a first prohibitor adapted to prohibit execution of non-secure executable instructions on secure data entities unless the non-secure executable instructions are recorded in the permitted instruction record; a prohibited instruction record; and a second prohibitor adapted to prohibit execution of non-secure executable instructions if the non-secure executable instructions are recorded in the prohibited instruction record.

20 Claims, 11 Drawing Sheets

METHOD FOR PROCESSING A SECURE SYSTEM MANAGER

CROSS-REFERENCE TO RELATED APPLICATIONS

This application is a continuation of co-pending U.S. patent application Ser. No. 13/773,435 entitled "METHOD FOR PROCESSING A SECURE SYSTEM MANAGER", filed Feb. 21, 2013, all of which is incorporated herein by reference for all purposes.

FIELD OF THE INVENTION

This invention relates to secure operation of processing devices. More particularly, the invention relates to a secure system manager distinct from and with priority over the operating system so as to control inputs to, outputs from, and commands executed by the device.

DESCRIPTION OF RELATED ART

Processing devices are often managed by broadly-accessible general support programs, sometimes referred to as "operating systems". An operating system typically manages resources, controls many device operating functions, and communicates with and supports other programs.

An operating system is most useful when it supports and/or communicates with a broad range of other programs. If an operating system won't "talk to" a program, the support features of the operating system are not available to that program, and the device may not be able to use the program.

However, an operating system that is broadly accessible is also broadly vulnerable. Programs may be written that perform functions that are undesirable and/or illegal, while still being technically valid programs. Such programs may take advantage of an operating system's broad accessibility to access the operating system itself, other programs, stored data, etc.

In view of these matters, a need exists for a better method and apparatus for securing processing devices.

BRIEF SUMMARY OF THE INVENTION

The present invention contemplates a variety of systems, apparatus, methods, and paradigms for processing using a secure system manager.

In one embodiment of the present invention, a secure processing method is provided. The method includes detecting communication among secure data entities and at least one non-secure data entity. Execution of a non-secure executable instruction from the non-secure data entity on any of the secure data entities is prohibited unless the non-secure executable instruction is recorded in a permitted instruction record. Execution of a non-secure executable instruction is prohibited if the non-secure executable instruction is recorded in a prohibited instruction record.

The permitted instruction record may exclude all non-secure executable instructions for non-secure data entities to read from secure data entities, so as to prohibit execution of all non-secure executable instructions for non-secure data entities to read from secure data entities. The permitted instruction may exclude all non-secure executable instructions for non-secure data entities to write to secure data entities, so as to prohibit execution of all non-secure executable instructions for non-secure data entities to write to said secure data entities.

The permitted instruction record may include at least one non-secure executable instruction for secure data entities to read from secure data entities, so as to permit execution of a non-secure executable instruction for secure data entities to read from secure data entities. The permitted instruction record may include at least one non-secure executable instruction for secure data entities to write to secure data entities, so as to permit execution of a non-secure executable instruction for secure data entities to write to secure data entities.

In another embodiment of the present invention, a secure processing method is provided. The method includes providing a plurality of secure data entities, including: instantiating a communication monitor on a processor, the communication monitor including secure executable instructions; defining a permitted instruction record; instantiating a first prohibitor on the processor, the first prohibitor including said secure executable instructions; defining a prohibited instruction record; and instantiating a second prohibitor on the processor, the second prohibitor including secure executable instructions. The method also includes providing at least one non-secure data entity, including instantiating a non-secure program on the processor, the non-secure program including non-secure executable instructions. The communication monitor detects communication among the secure data entities and non-secure data entity. The first prohibitor prohibits execution of non-secure executable instructions on secure data entities unless the non-secure executable instructions are recorded in the permitted instruction record. The second prohibitor prohibits execution of non-secure executable instructions if non-secure executable instructions are recorded in the prohibited instruction record.

The permitted instruction may exclude all non-secure executable instructions for non-secure data entities to read from secure data entities, such that the first prohibitor prohibits execution of all non-secure executable instructions for non-secure data entities to read from secure data entities. The permitted instruction record may exclude all non-secure executable instructions for non-secure data entities to write to secure data entities, such that the first prohibitor prohibits execution of all non-secure executable instructions for non-secure data entities to write to secure data entities.

The permitted instruction may include at least one non-secure executable instruction for secure data entities to read from said secure data entities, such that the first prohibitor permits execution of at least one non-secure executable instruction for secure data entities to read from secure data entities. The permitted instruction may include at least one non-secure executable instruction for secure data entities to write to said secure data entities, such that the first prohibitor permits execution of at least one non-secure executable instruction for secure data entities to write to secure data entities.

The method may include providing a loader, and providing a secure data store, the secure data store including secure executable instructions stored thereon. The loader may instantiate the communication monitor, first prohibitor, and second prohibitor on the processor from the secure executable instructions stored in the secure data store.

The method may include providing a non-secure data store, the non-secure data store including non-secure executable instructions stored thereon. The loader may instantiate the non-secure program on the processor from the non-secure executable instructions stored in the non-secure date store.

The loader may instantiate the communication monitor, first prohibitor, and second prohibitor on the processor before instantiating any non-secure data entities on the processor.

The method may include disposing at least one of the permitted instruction record and the prohibited instruction record on the secure data store. The method may include instantiating at least one of the permitted instruction record and the prohibited instruction record on the processor from the secure data store.

The method may include providing a secure input to said processor, the secure input being a secure data entity. The secure input may be provided to the processor from an external entity via a data receiver. The secure input may include streaming media, a password, and/or secure executable instructions. The secure input may be provided to the processor via a user interface.

The method may include the processor generating a secure output, the secure output being a secure data entity. The secure output may be delivered from the processor to an external entity via a data transmitter. The secure output may include streaming media, a password, and/or secure executable instructions.

The method may include providing a secure input to the processor, and the processor generating a secure output, the secure input and secure output being secure data entities.

The method may include providing secure streaming media to the processor from an external entity via a data receiver, and the processor delivering the secure streaming media to a user via a media unit. The method may include a user providing a password to the processor via a user interface, and the processor delivering the password to an external entity via a data transmitter. The method may include defining a password record, a user providing a password to the processor via a user interface, and the processor validating the password if the password is recorded in the password record.

The method may include establishing a connection with an external entity, the connection being a source of input to the processor and/or a destination of output from the processor. The connection may be validated, so as to define input from the connection as secure input and to define output to the connection as secure output, the secure input and secure output being secure data entities.

Validating the connection may include, in the processor, generating a first key using a first algorithm; generating a second key using a second algorithm and the first key; and transmitting the first key to the external entity. At the external entity, the second key is generated using said second algorithm and the first key, and the proposed second key is transmitted back to the processor. The second key generated in the processor is compared against the second key generated at the external entity. If the second key generated in the processor and the second key generated at the external entity are identical, the connection is determined to be validated.

The first key may be generated using information associated the secure data entities, the processor, and/or an apparatus incorporating the processor. A new first key may be generated each time a connection is established, the new first key being different from previous first keys.

In another embodiment of the present invention, a secure processing apparatus is provided. The apparatus includes a processor. The processor includes at least one non-secure data entity, including a non-secure program instantiated on the processor, the non-secure program including non-secure executable instructions. The processor includes a plurality of secure data entities, including: a communication monitor instantiated on the processor, the communication monitor including secure executable instructions, the communication monitor being adapted to detect communication among the secure data entities and the non-secure data entity; a permitted instruction record; a first prohibitor instantiated on the processor, the first prohibitor including secure executable instructions, the first prohibitor being adapted to prohibit execution of non-secure executable instructions on secure data entities unless the non-secure executable instructions are recorded in the permitted instruction record; a prohibited instruction record; and a second prohibitor instantiated on the processor, the second prohibitor including secure executable instructions, the second prohibitor being adapted to prohibit execution of non-secure executable instructions if the non-secure executable instructions are recorded in the prohibited instruction record.

The permitted instruction record may excludes all non-secure executable instructions reading from secure data entities. The permitted instruction record may exclude all non-secure executable instructions writing to secure data entities.

The permitted instruction record may record therein at least one non-secure executable instruction for secure data entities to read from said secure data entities. The permitted instruction record may record therein at least one non-secure executable instruction for secure data entities to write to secure data entities.

The prohibited instruction record may record therein at least one non-secure executable instruction for non-secure data entities reading from the processor. The prohibited instruction record may record therein at least one non-secure executable instruction for non-secure data entities writing to the processor.

The apparatus may include a data storage unit in communication with the processor, with secure data entities including a secure data store disposed on the data storage unit, the secure data store comprising secure executable instructions stored therein, and a loader adapted to instantiate the communication monitor, prohibitor, and second prohibitor on the processor from the secure executable instructions stored in the secure data store.

The prohibited instruction record may record therein at least one non-secure executable instruction for non-secure data entities reading from the data storage unit. The prohibited instruction record may record therein at least one said non-secure executable instruction for non-secure data entities writing to the data storage unit.

The secure data store may include the permitted instruction record and/or the prohibited instruction record thereon.

The non-secure data entities may include a non-secure data store disposed on the storage unit, the non-secure data store including non-secure executable instructions stored therein. The loader may be adapted to instantiate the non-secure program on the processor from the non-secure executable instructions in the non-secure data store.

The non-secure data entities may include comprise first and second non-secure data stores disposed on the storage unit, the first and second non-secure data stores including non-secure executable instructions stored therein. The loader may be adapted to instantiate the non-secure program on the processor from the non-secure executable instructions in the first non-secure data store. The second non-secure data store may include backup storage for the first non-secure data store.

The secure data entities may include a secure backup controller adapted to read from and write to the first and second non-secure data stores so as to backup the first non-secure data store to the second non-secure data store, and so as to restore the first non-secure data store from the second non-secure data store. The prohibited instruction record may record therein all non-secure executable instructions writing to the second non-secure data store.

The apparatus may include an input unit in communication with the processor, with the secure data entities further including a secure input, the secure input being adapted to input to the apparatus via the input unit.

The prohibited instruction record may record therein at least one non-secure executable instruction for at least one of the non-secure data entities to read from the input unit.

The input unit may include an imager, an audio receiver, a data receiver, and/or a user interface. The secure input may include streaming media, a password, and/or secure executable instructions.

The apparatus may include an output unit in communication with the processor, the secure data entities further including a secure output, the secure output being adapted to output from the apparatus via the output unit.

The prohibited instruction record may record therein at least one non-secure executable instruction for writing to the output unit.

The output unit may include a graphical display, an audio emitter, and/or a data transmitter. The secure output may include streaming media and/or a password.

The apparatus may include an input unit in communication with the processor and an output unit in communication with the processor. The secure data entities may include a secure input, the secure input being adapted to input to the apparatus via the input unit. The secure data entities may include a secure output, the secure output being adapted to output from the apparatus via the output unit.

The input unit may include a data receiver, with secure input including streaming video data. The output unit may include a graphical display, with secure output including streaming video.

The input unit may include a data receiver, with secure input including streaming audio data. The output unit may include an audio emitter, with secure output including streaming audio.

The input unit may include a user interface, with secure input including a password. The output unit may include a data transmitter, with secure output including password data.

The secure data entities may include a secure video driver, a secure audio driver, and/or a secure password manager.

The apparatus may include an input unit in communication with the processor, with non-secure data entities including a non-secure input, the said non-secure input being adapted to input to the apparatus via the input unit. The apparatus may include an output unit in communication with the processor, with non-secure data entities including a non-secure output, the non-secure output being adapted to output from the apparatus via the output unit.

The non-secure data entity may include a non-secure input, the non-secure input being adapted to input to the apparatus via the input unit. The non-secure data entity may include a non-secure output, the non-secure output being adapted to output from the apparatus via the output unit.

The non-secure input may include non-secure executable instructions. The non-secure output may include non-secure executable instructions.

The apparatus may include a portable media unit. The apparatus may include a wearable media unit. The apparatus may include a head mounted display.

In another embodiment of the present invention, a head mounted display is provided. The head mounted display includes a body adapted to be worn on a user's head, a processor adapted for executing executable instructions, at least one input unit in communication with the processor, at least one output unit in communication with the processor, the output unit including at least one graphical display disposed proximate at least one of the user's eyes, and a data storage unit in communication with the processor. The apparatus includes a plurality of non-secure data entities, including: a non-secure program instantiated on the processor, the non-secure program including non-secure executable instructions; a non-secure data store disposed on the storage unit, the non-secure data store including non-secure executable instructions stored therein; a non-secure input, the non-secure input being adapted to input to the apparatus via the input unit; and a non-secure output, the non-secure output being adapted to output from the apparatus via the at least one output unit. The apparatus also includes a plurality of secure data entities, including: a communication monitor instantiated on the processor, the communication monitor including secure executable instructions, the communication monitor being adapted to detect communication among the secure data entities non-secure data entities; a permitted instruction record instantiated on the processor; a first prohibitor instantiated on the processor, the first prohibitor including secure executable instructions, the first prohibitor being adapted to prohibit execution of non-secure executable instructions on secure data entities unless the non-secure executable instructions are recorded in the permitted instruction record; a prohibited instruction record instantiated on said processor; and a second prohibitor instantiated on the processor, the second prohibitor including secure executable instructions, the second prohibitor being adapted to prohibit execution of non-secure executable instructions on secure data entities if the non-secure executable instructions are recorded in the prohibited instruction record; a secure data store disposed on the data storage unit, the secure data store including secure executable instructions stored therein; a secure input, the secure input being adapted to input to the apparatus via the at least one input unit; a secure output, the secure output being adapted to output from the apparatus via the at least one output unit; and a loader adapted to instantiate the communication monitor, permitted instruction record, first prohibitor, prohibited instruction record, and second prohibitor on the processor from the secure executable instructions stored in the secure data store, and to instantiate the non-secure program on the processor from the non-secure executable instructions in the non-secure data store. The permitted instruction record excludes all non-secure executable instructions reading from any secure data entities; the permitted instruction record excludes all non-secure executable instructions writing to any secure data entities.

The input unit may include an imager. The input unit may include a stereo pair of imagers. The input unit may be adapted to capture three dimensional spatial information.

In another embodiment of the present invention, an apparatus is provided. The apparatus includes processing means for executing executable instructions. The apparatus includes at least one non-secure data means, including a non-secure instructing means for delivering non-secure executable instructions to the processing means, the non-secure instructing means being instantiated in the processing means. The apparatus includes a plurality of secure data means, including: monitoring means for detecting communication among the secure data means and non-secure data means, the monitoring means being instantiated in the processing means; means for recording permitted instructions; first prohibiting means for prohibiting the processing means from executing non-secure executable instructions on the secure data means unless the non-secure executable instructions are recorded in the means for recording permitted instructions, the first prohibiting means being instantiated in the processing means; means for recording prohibited instructions; and second prohibiting means for prohibiting the processing means from executing non-secure executable instructions on non-secure data means if the non-secure executable instructions are recorded in the means for recording prohibited instructions, the second prohibiting means being instantiated in the processing means.

DETAILED DESCRIPTION OF THE INVENTION

Figure 1:
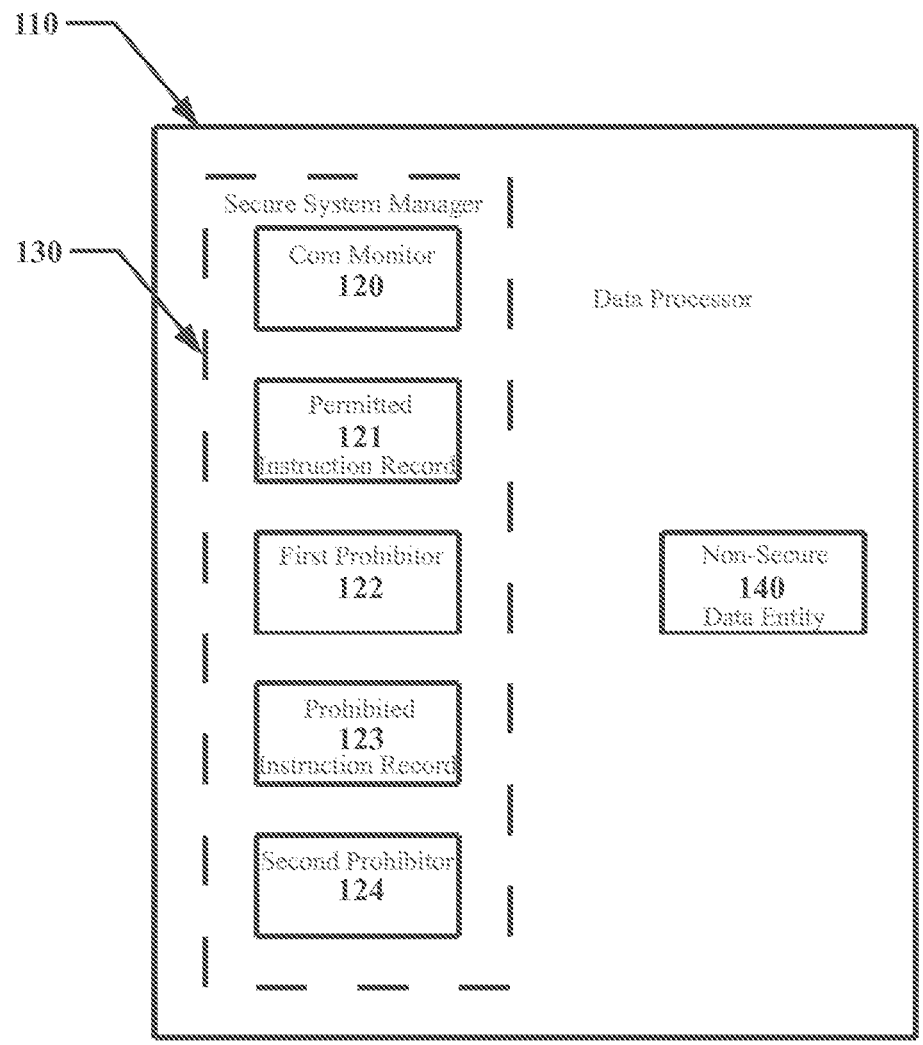
FIG. 1 shows a functional diagram of an embodiment of an apparatus in accordance with the present invention.

Referring to FIG. 1, a structural diagram of an embodiment of a secure processing apparatus in accordance with the present invention is shown.

The apparatus includes a data processor 110 capable of executing executable instructions. The invention is not particularly limited with regard to the choice of processor 110. Suitable data processors 110 include but are not limited to digital electronic microprocessors. Although the processor 110 is referred to herein for clarity as though it were a self-contained physical device, this is not required, and other arrangements may be suitable. For example, the processor 110 may constitute a processing capability in a network, without a well-defined physical form.

A distinction is made herein between secure executable instructions and non-secure executable instructions. The significance of the distinction is described below in detail, however, it should be understood that both secure and non-secure executable instructions are executable instructions, in that both secure and non-secure executable instructions are in principle executable by the processor 110.

Again with reference to FIG. 1, the apparatus includes several secure data entities 120 through 124 instantiated on the processor 110. The secure data entities include a communication monitor 120, a permitted instruction record 121, a first prohibitor 122, a prohibited instruction record 123, and a second prohibitor 124, each of which is described below. The secure data entities 120 through 124 are data constructs. That is, the secure data entities are in their essence data, whether records, executable instructions, or other information.

In addition, the apparatus includes at least one non-secure data entity 140. The non-secure data entity 140 likewise is in its essence data.

With respect to the individual secure and non-secure data entities shown in FIG. 1, the communication monitor 120 is a secure data entity that includes therein secure executable instructions, which are adapted so as to monitor communication among data entities, including but not limited to the secure data entities 120 through 124 and the non-secure data entity 140. Communication among data entities includes, but is not limited to, the transmission of data to and/or from any of the data entities, and the execution of instructions by and/or on any of the data entities. Communication that includes attempts to execute instructions to read from and/or write to any of the data entities is of particular interest with respect to the present invention, though the communication monitor 120 is not limited thereto, and may monitor any and/or all communications among data entities.

The permitted instruction record 121 is a secure data entity that records therein non-secure executable instructions that are applicable to the first prohibitor 122. The permitted instruction record 121 may include full copies of entire non-secure executable instructions, however this is not required. The permitted instruction record 121 may alternately include notations, codes, or other means for recording non-secure executable instructions without necessarily including complete copies of those non-secure executable instructions. Moreover, the permitted instruction record 121 may include rules for recording groups or classes of non-secure executable instructions, e.g. based on the source of a non-secure executable instruction, the destination of a non-executable instruction, or other factors. Multiple such approaches may also be combined.

Thus, though the permitted instruction record 121 may include copies of non-secure executable instructions, the permitted instruction record 121 does not necessarily include any non-secure executable instructions. Indeed, the permitted instruction record 121 need not necessarily include any executable instructions of any sort. The permitted instruction record 121 serves as a comparison for the use of the first prohibitor 122 in distinguishing among non-secure executable instructions.

The permitted instruction record 121 may be empty. That is, for certain embodiments there may be no non-secure executable instructions recorded in the permitted instruction record 121.

Still with regard to FIG. 1, the first prohibitor 122 is a secure data entity that includes secure executable instructions therein. The first prohibitor 122 is adapted to prohibit execution of any non-secure executable instructions on secure data entities unless those non-secure executable instructions are recorded in the permitted instruction record 121. The first prohibitor 122 may be considered a sort of "sieve" for the execution of non-secure executable instructions: of all possible non-secure executable instructions that could potentially be executed upon secure data entities, only those non-secure executable instructions that are specifically recorded in the permitted instruction record 121 are permitted by the first prohibitor for execution by the processor 110.

Turning to the prohibited instruction record 123, the prohibited instruction record 123 is a secure data entity that records therein non-secure executable instructions that are applicable to the second prohibitor 124. As with the permitted instruction record 121, the prohibited instruction record 123 may include full copies of entire non-secure executable instructions, may include notations, codes, or other means for recording non-secure executable instructions without necessarily including complete copies of those non-secure executable instructions, may include rules for recording groups or classes of non-secure executable instructions, and/or some combination thereof.

Like the permitted instruction record 121, the prohibited instruction record 123 need not necessarily include any executable instructions of any sort. The prohibited instruction record 123 serves as a comparison for the use of the second prohibitor 124 in distinguishing among non-secure executable instructions.

The prohibited instruction record 123 may be empty. That is, there may be no non-secure executable instructions recorded in the prohibited instruction record 123.

Again with regard to FIG. 1, the second prohibitor 124 is a secure data entity that includes secure executable instructions therein. The second prohibitor 124 is adapted to prohibit execution of any non-secure executable instructions if those non-secure executable instructions are recorded in the prohibited instruction record 122. Like the first prohibitor 122, the second prohibitor 124 may be viewed as a "sieve" for the execution of non-secure executable instructions. The second prohibitor 124 prohibits the execution of non-secure executable instructions if those non-secure executable instructions are specifically recorded in the prohibited instruction record 123.

An emphasis of the similarities and differences between the first and second prohibitors 122 and 124 is in order.

Both the first and second prohibitors 122 and 124 are secure data entities. Both the first and second prohibitors 122 and 124 include secure executable instructions. Both the first and second prohibitors 122 and 124 function to prohibit execution of certain non-secure executable instructions.

However, the first prohibitor 122 affects non-secure executable instructions addressed to or affecting secure data entities, while the second prohibitor 124 affects non-secure executable instructions regardless of where or to what those non-secure executable instructions may be addressed. In addition, the first prohibitor 122 by default prohibits execution unless the relevant non-secure executable instruction is recorded in the permitted instruction record 121, while the second prohibitor 124 by default permits execution unless the relevant non-secure executable instruction is recorded in the prohibited instruction record 123.

As noted earlier, a distinction is made with respect to the present invention between secure and non-secure executable instructions. The aforementioned distinction is defined in terms of the source of a particular executable instruction.

Specifically, secure executable instructions are those executable instructions deriving from secure data entities, while non-secure executable instructions are those executable instructions that do not derive from secure data entities, that is, that derive from non-secure data entities.

In turn, secure data entities are defined to be secure data entities; there need not necessarily be a substantive difference between secure and non-secure data entities in terms of data structure, executable instruction format, etc. Such differences are permitted, and may be useful in some embodiments, e.g. secure data entities and/or secure executable instructions might include coding, encryption, or other formatting that inherently distinguishes secure data entities and/or secure executable instructions from non-secure data entities and/or non-secure executable instructions. However, this is an example only. The manner by which data entities and the executable instructions thereof are identified as secure or non-secure may vary from one embodiment to another, and the present invention is not limited thereby.

Regardless of how the distinction between secure and non-secure executable instructions may be implemented, given such a distinction between secure and non-secure executable instructions, and the previous description of the secure data entities 120 through 124, the present invention provides for security of a processing apparatus in at least the following manners.

First, secure executable instructions are executed by the processor 110 regardless of target, and without restriction by either the first or second prohibitor 122 and 124 (neither the first nor the second prohibitor 122 and 124 addresses secure executable instructions). Any other restrictions on the execution of executable instructions (e.g. any internal limitation that might be present internally in the non-secure data entity 140 so as to regulate normal functioning thereof) are also ignored by secure executable instructions. In sum, if a secure executable instruction calls for an action to take place, that action will take place; secure executable instructions have priority. Thus, any necessary security function of the secure data entities 120 through 124 will be carried out.

Second, among all possible non-secure executable instructions addressing or affecting any secure data entity, only those non-secure executable instructions that are specifically pre-approved for execution—that is, non-secure executable instructions that are recorded in the permitted instruction record 121 so as not to be prohibited by the first prohibitor 122—are executed by the processor 110. Thus, the secure data entities 120 through 124 are effectively "untouchable" by the non-secure data entity 140, with only limited and deliberately selected exceptions.

Third, non-secure executable instructions addressing or affecting targets other than secure data entities 120 through 124 also may be specifically prohibited. That is, any non-secure executable instruction may be recorded in the prohibited instruction record 123 so as to be prohibited by the second prohibitor 124 from being executed by the processor 110. Thus, any non-secure executable instruction that is undesirable can be readily prohibited, regardless of what that non-secure executable instruction is, or what that non-secure executable instruction would potentially address.

Thus, the secure data entities 120 through 124 are protected from access by and command from the non-secure data entity 140 except as specifically necessary and desirable for the operation of the apparatus; that protection is accomplished by the secure data entities 120 through 124 themselves. Whatever functions the non-secure data entity 140 performs, those functions may be performed without risking the data security of the processor 110, or of an apparatus to which the processor 110 might be connected.

As will be described further with regard to other figures, other secure data entities than the communication monitor 120, the permitted instruction record 121, the first prohibitor 122, the prohibited instruction record 123, and the second prohibitor 124 may exist in certain embodiments of the present invention. However, because these five secure data entities 120 through 124 provide the security functions described above—protection of the secure data entities themselves through "veto power" over non-secure executable instrutions—these five secure data entities 120 through 124 are referred to collectively as the secure system manager 130.

In some embodiments, the secure system manager 130 may be a unified entity, e.g. a single program, with secure data entities 120 through 124 existing as subroutines, etc. therein. However, this is not required, and in other embodiments secure data entities 120 through 124 may be distinct individual programs, files, etc. In addition, the secure system manager 130 may include other secure data entities besides 120 through 124. The term secure system manager 130 is largely one of convenience, to refer collectively to those elements of various embodiments of the present invention corresponding to secure data entities 120 through 124.

The nature and functionality of the non-secure data entity 140 itself may vary greatly without compromising the security functions of the secure system manager 130. For example, the non-secure data entity 140 may be an operating system. In such instance, the non-secure data entity 140 could perform typical operating system functions such as managing the processor 110 and the device (if any) with which the processor 110 is connected, and of interfacing and/or communicating with other applications, drivers, data files, etc. that may run on the processor 110, while security is maintained by the secure system manager 130.

However, the presence of an operating system as a non-secure data entity 140 is an example only. Other data entities, including but not limited to applications, data files, drivers, etc. may exist as a non-secure data entity 140, with similar security provided by the secure system manager 130 regardless. Moreover, multiple non-secure data entities may be present in some embodiments.

It should be noted that as shown in FIG. 1, the secure system manager 130 and its components secure data entities 120 through 124 are present in the same processor 110 as the non-secure data entity 140. Thus, the secure data entities 120 through 124 and the non-secure data entity 140 are, or at least potentially could be, in mutual communication. The present invention does not require either hardware separation or other isolation of the secure system manager 130 from the non-secure data entity 140; as described above with regard to secure data entities 120 through 124, the secure system manager 130 is self-protecting. Thus, for example, the present invention may be implemented as shown in FIG. 1 on a single processor 110. The use of two or more processors is not excluded from the present invention, and some embodiments may include two or more processors, but a single processor 110 is sufficient.

Still with regard to FIG. 1, the secure system manager 130 may in some embodiments provide additional security through, for example, selection of the contents of the permitted instruction record 121 and the prohibited instruction record 123.

For example, the permitted instruction record 121 may exclude therefrom records of non-secure executable instructions that would read from or write to a secure data entity. This exclusion could specifically encompass those secure data entities 120 through 124 shown explicitly in FIG. 1, and/or might be a broad exclusion of any non-secure executable instructions that would read from or write to any secure data entity. Such an arrangement would cause the first prohibitor 122 to prohibit execution of non-secure executable instructions reading from or writing to secure data entities. Thus, secure data entities could not be altered, overwritten, replaced, etc. thereby. This arrangement would effectively prevent non-secure data entities from modifying or even viewing secure data entities, thus protecting the secure system manager 130 against attacks relying on such approaches.

As a more particular example, if the non-secure data entity 140 in question were a virus, that virus would be unable to modify the contents of the secure system manager 130 so as to carry out attacks or other undesirable functions, and would also be unable to even view data in the secure system manager 130 such as passwords, security protocols, etc.

Similarly, the prohibited instruction record 123 might for example include therein records of specific non-secure executable instructions that, while not necessarily being directed to secure data entities, might compromise security or have some other undesirable effect. For example, the prohibited instruction record 123 might record therein non-secure executable instructions to directly read the processor 110. Such non-secure executable instructions would then be prohibited by second prohibitor 124. It will be understood that, absent such prohibition, executing non-secure executable instructions to directly read from, write to, and/or modify the function of the processor 110 itself could represent an "end run" around prohibitions against reading from or writing to secure data entities. By including prohibitions against such approaches in the prohibited instruction record 123, the second prohibitor 124 can prohibit execution of such non-secure executable instructions to provide greater security.

It is noted that certain security features of the present invention may be most effective if the hardware and/or the secure software are controlled.

In terms of hardware, control may imply that physical components are selected, and/or an overall design is implemented, such that a distinction between secure and non-secure data entities is readily maintained. Hardware control may also imply design and construction of an apparatus so as to restrict direct user access to secure data entities, and/or to hardware components themselves, so as not to facilitate external and/or physical work-arounds of the security measures.

In terms of software, it may be useful to limit programming access to the secure system manager and/or to other secure data entities, so as not to facilitate additions, modifications, etc. of software implementations of security features of the present invention.

Figure 2:
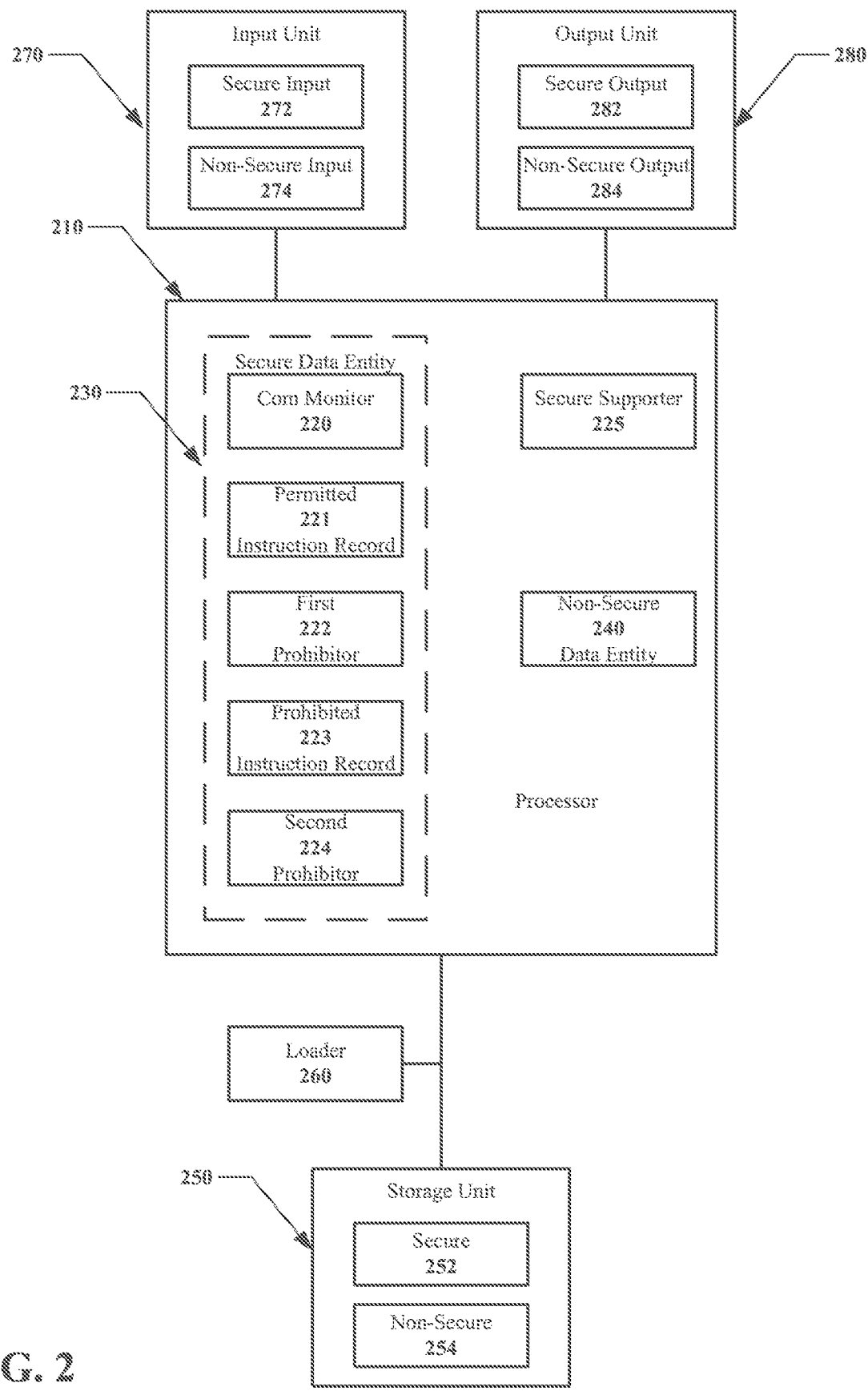
FIG. 2 shows a functional diagram of another embodiment of an apparatus in accordance with the present invention, with input, output, and data storage units.

Turning to FIG. 2, another embodiment of the present invention is shown. Similarly to the embodiment shown in FIG. 1, the embodiment shown in FIG. 2 includes a processor 210, secure data entities 220 through 224 that may be collectively considered as a secure system manager 230, and at least one non-secure data entity 240. These elements are similar to their counterparts in FIG. 1.

However, the embodiment shown in FIG. 2 also includes therein additional elements, described below.

The embodiment of FIG. 2 includes a secure supporter 225, which is a secure data entity including secure executable instructions. The secure supporter 225 may support secure functions other than those described for the secure system manager 230 or the secure data entities 220 through 224 that make up the secure system manager 230.

For example, for some embodiments the secure supporter 225 might include secure executable instructions for managing streaming media, for managing passwords, for instantiating other secure data entities to the processor 210 or managing other secure data entities on the processor 210, etc. The specific functionality of the secure supporter 225 is not particularly limited, and a wide range of possible functions and/or secure executable instructions may be suitable for the secure supporter 225. Some embodiments of the present invention may have multiple secure supporters; other embodiments may have no secure supporters.

The embodiment of FIG. 2 also includes a data storage unit 250 in communication with the processor 210. Suitable data storage units 250 include but are not limited to magnetic hard drives, optical drives, and solid state memory devices. The present invention is not particularly limited with regard to the type of data storage unit 250. Moreover, although the data storage unit 250 is referred to herein for clarity as though it were a self-contained physical device, this is not required, and the use of non-discrete and/or non-physical data storage such as cloud storage as a data storage unit 250 may be equally suitable.

A secure data store 252 is disposed on the data storage unit 250. The secure data store 252 is a secure data entity, and includes secure executable instructions stored therein. The secure executable instructions stored in the secure data store 252 include those necessary for instantiating the communication monitor 220, the permitted instruction record 221, the first prohibitor 222, the prohibited instruction record 223, and the second prohibitor 224 onto the processor 210.

It is to be understood that, because of the operation of the secure system manager 230 as described previously, non-secure executable instructions directed to the secure data store 252 will be prohibited by the first prohibitor 222 unless those non-secure executable instructions are recorded in the permitted instruction record 221. Additionally, non-secure executable instructions directed to the data storage unit 250 may be prohibited by the second prohibitor 224 if those non-secure executable instructions are recorded in the prohibited instruction record 223.

A non-secure data store 254 is also disposed on the data storage unit 250. The non-secure data store 254 is a non-secure data entity, and includes non-secure executable instructions stored there. The non-secure executable instructions stored in the non-secure data store 254 include those necessary for instantiating the non-secure data entity 240 onto the processor 210.

It should be noted that as shown in FIG. 2, the secure data store 252 and non-secure data store 254 are disposed in the same data storage unit 250. Thus, the secure data store 252 and the non-secure data store 254 are, or at least potentially could be, in mutual communication. The present invention does not require either hardware separation or other isolation of the secure data store 252 from the non-secure input 254. The use of two or more data storage units is not excluded from the present invention, and some embodiments may include two or more data storage units, but a single data storage unit 250 is sufficient for both secure and non-secure data stores 252 and 254.

The embodiment of FIG. 2 also includes a loader 260 in communication with the processor 210 and the data storage unit 250. The loader is a secure data entity, and includes secure executable instructions for "bootstrapping" the secure executable instructions for the secure data entities 220 through 224 stored in the secure data store 252 to the processor 210, so as to instantiate the secure data entities 220 through 224 on the processor 210. The loader 260 similarly includes executable instructions for "bootstrapping" the non-secure data instructions for the non-secure data entity 240 stored in the non-secure data store 252 to the processor 210, so as to instantiate the non-secure data entity 240 on the processor 210.

The present invention is not particularly limited with respect to the loader 260. As described, the loader includes secure executable instructions, and is considered to be a secure data entity. In some embodiments the loader may be a data only, e.g. instructions permanently resident in non-volatile memory on the processor 210 itself. However, this is an example only, and other arrangements may be equally suitable. For example, in other embodiments the secure executable instructions of the loader 260 may exist as firmware, as non-rewritable media, as hardware, and/or may be in some other fashion associated and/or integrated with some physical substance and/or structure.

As noted, the present invention may include secure data entities and/or non-secure data entities other than those specifically described here. The loader 260 does not necessarily load all possible secure and/or non-secure data entities. Rather, the loader 260 loads at least those secure and non-secure entities necessary to "bootstrap" the system, that is, to put sufficient executable instructions in place so as to enable further data entities to be loaded as necessary.

For some embodiments, the loader 260 may load the secure data entities 220 through 224 before loading the non-secure data entity 240. In such an arrangement, the secure system manager 230 will then be in place and active before the non-secure data entity 240, so that the non-secure data entity 240 cannot execute undesirable non-secure executable instructions before the secure system manager 230 is capable of prohibiting the execution thereof.

When a data entity, secure or non-secure, is referred to herein as loading to and/or instantiating on the processor 210, this should be understood as meaning that a sufficient portion of the executable instructions and/or data for that data entity are established on the processor 210 so as to enable the data entity to operate as described herein. It is not necessarily the case that all possible stored executable instructions and/or data are loaded to the processor 210 at a given time; it may be equally suitable for part of the executable instructions and/or data to load to the processor 210 at different times and in different orders. It is not necessary that the entirety of possible executable instructions and/or data for a given data entity are present on the processor 210 at a given time; it may be equally suitable for some portion of a data entity to be present, while other portions are not be present. Furthermore, it is not necessary that all portions of a data entity are ever loaded onto the processor 210; it may be equally suitable that some portions of a data entity never load to the processor 210, e.g. if the functionality of some portion of a data entity is never called upon, that portion may never load. However, such arrangements are examples only, and other arrangements may be equally suitable.

Referring again to the secure data store 252, the secure data store 252 may also contain other secure data besides the secure data entities 220 through 224, such as other stored secure data entities that may also load to the processor 210. Possible additional secure data entities besides those specified as 220 through 224 are not particularly limited with regard to function or content, and may include but are not limited to device drivers, applications, application files, encryption protocols, etc.

Similarly, the non-secure data store 254 may also contain other non-secure data besides the non-secure data entity 240, such as other stored non-secure data entities that may also load to the processor 210. Possible additional non-secure data entities also are not particularly limited with regard to function or content, and may include but are not limited to device drivers, applications, application files, encryption protocols, etc.

Again with reference to FIG. 2, the embodiment therein includes an input unit 270 in communication with the processor 210. The input unit 270 receives therein, and communicates to the processor 210, secure input 272 and non-secure input 274.

The input unit 270 is not particularly limited with regard to the present invention. A variety of input units 270 may be suitable for use with the present invention, including but not limited to modems, wifi, Bluetooth, and other data communication devices, keyboards, mice, touch pads, and other user interfaces, microphones, imagers such as cameras, including stereo pair or other 3D input imagers, etc. Substantially any construct that can convey data to the processor 210 may be suitable.

The secure input 272 is a secure data entity that includes data delivered to the processor via the input unit 270. The specific content of the secure input 272 may vary considerably depending on the particular embodiment and on the use thereof, and the invention is not particularly limited with regard to the content of the secure input 272. Examples of secure input 272 include, but are not limited to, streaming media such as streaming video or streaming audio, secure executable instructions (because the secure input 272 is a secure data entity, as noted earlier executable instructions received as secure input 272 are by definition secure executable instructions), passwords, files, or other data.

It is to be understood that, because of the operation of the secure system manager 230 as described previously, non-secure executable instructions directed to the secure input 272 will be prohibited by the first prohibitor 222 unless those non-secure executable instructions are recorded in the permitted instruction record 221. Additionally, non-secure executable instructions directed to the input unit 270 may be prohibited by the second prohibitor 224 if those non-secure executable instructions are recorded in the prohibited instruction record 223.

The non-secure input 274 is a non-secure data entity that includes data delivered to the processor via the input unit 270. The specific content of the non-secure input 274 may vary considerably depending on the particular embodiment and on the use thereof, and the invention is not particularly limited with regard to the content of the non-secure input 274. Examples of non-secure input 274 include, but are not limited to, streaming media such as streaming video or streaming audio, non-secure executable instructions (because the non-secure input 274 is a non-secure data entity, as noted earlier executable instructions received as non-secure input 272 are by definition non-secure executable instructions), files, or other data.

Further with reference to FIG. 2, the embodiment therein includes an output unit 280 in communication with the processor 210. The output unit 280 receives therein, and communicates to the processor 210, secure output 282 and non-secure output 284.

The output unit 280 is not particularly limited with regard to the present invention. A variety of output units 280 may be suitable for use with the present invention, including but not limited to modems, wifi, Bluetooth, and other data communication devices, graphical displays including stereo pair or other 3D output displays, audio emitters, etc. Substantially any construct that can convey data from the processor 210 may be suitable.

The secure output 282 is a secure data entity that includes data delivered from the processor 210 to the output unit 280. The specific content of the secure output 282 may vary considerably depending on the particular embodiment and on the use thereof, and the invention is not particularly limited with regard to the content of the secure output 282. Examples of secure output 282 include, but are not limited to, streaming media such as streaming video or streaming audio, secure executable instructions (e.g. from the secure system manager 230), files, passwords, or other data.

It is to be understood that, because of the operation of the secure system manager 230 as described previously, non-secure executable instructions directed to the secure output 282 will be prohibited by the first prohibitor 222 unless those non-secure executable instructions are recorded in the permitted instruction record 221. Additionally, non-secure executable instructions directed to the output unit 280 may be prohibited by the second prohibitor 224 if those non-secure executable instructions are recorded in the prohibited instruction record 223.

The non-secure output 284 is a non-secure data entity that includes data delivered from the processor 210 to the output unit 280. The specific content of the non-secure output 284 may vary considerably depending on the particular embodiment and on the use thereof, and the invention is not particularly limited with regard to the content of the non-secure output 284. Examples of non-secure output 284 include, but are not limited to, streaming media such as streaming video or streaming audio, non-secure executable instructions (e.g. from the non-secure data entity 240), files, or other data.

It should be noted that as shown in FIG. 2, the secure input 272 and non-secure input 274 are received in the same input unit 270. Thus, the secure input 272 and the non-secure input 274 are, or at least potentially could be, in mutual communication. The present invention does not require either hardware separation or other isolation of the secure input 272 from the non-secure input 274. The use of two or more input units is not excluded from the present invention, and some embodiments may include two or more input units, but a single input unit 270 is sufficient for both secure and non-secure input 272 and 274.

Likewise, the present invention does not require either hardware separation or other isolation of the secure output 282 from the non-secure output 284. The use of two or more output units is not excluded from the present invention, and some embodiments may include two or more output units, but a single output unit 280 is sufficient for both secure and non-secure output 282 and 284.

Having described the structure and function of individual components of the present invention, it may be illuminating at this point to provide some discussion of the present invention as a whole.

As described herein and illustrated in FIG. 2, the secure system manager 230 functions as a high-priority control system for the processor 210. The secure system manager 230 can issue instructions to other elements of the apparatus with which the processor 210 is in communication, and/or which are instantiated on the processor 210 along with the secure system manager 230. In addition, the secure system manager 230 can and does selectively prohibit instructions sent by and one or more non-secure data entities 240, which may include but are not limited to an operating system.

The secure system manager 230 (more particularly the first prohibitor 222) prohibits the execution of non-secure executable instructions to the secure system manager 230 itself, to other secure data entities such as the secure data store 252, the secure input 272, and the secure output 282, unless those non-secure executable instructions are explicitly recorded in the permitted instruction record 221. Moreover, any non-secure executable command regardless of target may be prohibited by the secure system manager 230 (more particularly the second prohibitor 224) if those non-secure executable commands are recorded in the prohibited instruction record 223.

Typically, the permitted instruction record 221 will not record therein non-secure executable instructions to read from or write to any secure data entity.

Because the secure system manager 230 itself is a secure data entity (or several secure data entities 220 through 224), the secure system manager 230 is self-protecting. Moreover, because the secure data store 252 is a secure data entity, the secure system manager 230 also protects the secure data store 252; thus attacks against the stored executable instructions in the secure data store 252 that instantiate to the secure system manager 230 are also protected by the secure system manager. In addition, the secure system manager 230 protects secure input 272 and secure output 282. Any secure supporters 225 or other secure data entities are also protected by the secure system manager 230.

As described, "protection" as provided by the secure system manager 230 typically includes denying the execution of non-secure executable instructions that might read from or write to secure data entities. Thus, in essence the non-secure data entity 240 not only does not control but cannot "see" the content of the secure system manager 230 or other secure data entities.

Still with regard to the arrangement shown in FIG. 2, several examples may be illustrative.

As a first example, consider an arrangement wherein the non-secure data entity 240 is an operating system. Numerous other applications, files, drivers, and/or other programs may be loaded onto the processor 210 at some point, with those programs being supported by and in communication with the operating system. If, at some point, a virus or other malicious program is loaded, that malicious program could potentially corrupt the operating system. However, the operating system (the non-secure data entity 240 in this example) does not have command authority over the secure system manager 230. That is, non-secure executable instructions from the operating system would only be executed on the secure system manager 230 or other secure data entities if deliberately recorded in the permitted instruction record 221. It may be reasoned that malicious non-secure executable instructions would not be deliberately included in the permitted instruction record 221, thus any such malicious non-secure executable instructions would be prohibited by the secure system manager 230 (specifically the first prohibitor 222). Likewise, it may be reasoned that potential malicious non-secure executable instructions addressed to the processor 210, the data storage unit 250, the input unit 270, and/or the output unit 280 would be deliberately recorded in the prohibited instruction record 223, and thus those malicious non-secure executable instructions would also be prohibited by the secure system manager 230 (in this case specifically the second prohibitor 224).

The apparatus overall is therefore protected from such attack and/or corruption. Though the operating system or other non-secure data entity 240 may potentially be attacked and/or corrupted, the secure system manager 230 and other secure data entities remain protected. With the secure system manager 230 and other secure data entities intact, detecting and eliminating the malicious program, and repairing damage done to the non-secure data entity 240 is relatively straightforward to facilitate.

A distinction should be understood between the secure system manager 230, and secure data entities in the present invention more generally, and a non-secure data entity 240 in the form of an operating system. The secure system manager 230 manages system security, protecting secure data entities from being improperly read, overwritten, modified, subverted, etc. (those secure data entities including the secure system manager 230 itself). The secure system manager 230 is not necessarily an operating system, nor is the secure system manager 230 necessarily required to replace or function in the role of an operating system. Although the secure system manager 230 and/or other secure data entities may perform certain functions sometimes considered to be part of or related to an operating system, e.g. managing secure streaming video, neither the secure system manager 230 nor secure data entities as a whole are required to carry out functions of an operating system aside from security as described herein. Moreover, as noted in the example above, the presence of a secure system manager 230 and/or other secure data entities does not preclude the presence of an operating system.

Likewise, it should also be understood that the presence of the secure system manager 230 does not preclude additional security measures, e.g. virus-detection software, firewalls, etc. In some embodiments, some or all such additional security measures may be implemented as secure data entities, but this is an example only, and other arrangements may be equally suitable.

Moving onward, as a second example consider an arrangement wherein the processor 210 is streaming video. Streaming video data is received by the processor 210 as secure input 272 via the input unit 270 (in this case the input unit 270 perhaps being a modem) and transmitted by the processor 210 as secure output 282 to the output unit 280 (in this case the output unit perhaps being a graphical display). In such instance, the secure supporter 225 might be a video driver, suitable for managing the secure input 272 and/or the secure output 282, and/or the input unit 270 and/or the output unit 280.

Consider further that in this example the streaming video is copyrighted media, wherein a user may have legal rights to view the video but not to copy the video, save or store the video, redistribute the video, etc.

It may be reasoned that secure data entities themselves will not include secure executable instructions so as to deliberately pirate media. Because the secure system manager 230 protects itself and other secure data entities, non-secure executable instructions attempting to save or copy the streaming media by taking control of the secure data entities would be prohibited.

Moreover, as described earlier, typically the permitted instruction record 221 excludes non-secure executable instructions to read from or write to secure data entities. Thus, the non-secure data entity 240 cannot read from either the secure input 272 or the secure output 282. The secure supporter 225, if involved, also cannot be read from or written to by the non-secure data entity 240. In essence, the non-secure data entity 240 (e.g. an operating system or application) does not "see" the streaming media, and therefore cannot copy, save, etc. the streaming media. Furthermore, as also described earlier, the prohibited instruction record 223 can record non-secure executable instructions with any target. The prohibited instruction record 223 can therefore record, and the second prohibitor 224 can prohibit, non-secure executable instructions that would directly access the input unit 270 (modem), the processor 210, and/or the output unit 280 (display) in such fashion as to access the streaming media directly from hardware as the streaming media is received, processed, and/or displayed (e.g. using a frame grabber).

As a third example, still with regard to the embodiment in FIG. 2, consider an arrangement wherein a user is entering a password. The password is received by the processor 210 as secure input 272 via the input unit 270, in this case the input unit 270 perhaps being a keyboard. In this instance the secure supporter 225 might be a password manager. If the password is to be validated externally, the password may also be transmitted by the processor 210 as secure output 282 to the output unit 280, in this case the output unit perhaps being a modem.

As with the streaming media in the second example, in this example, the user's own data is protected. The user's password is entered as, processed by, and transmitted as, secure data entities. As such, the user's password is secured against non-secure executable instructions. A virus, keylogger, or other malicious program that might be present as the non-secure data entity 240 will not "see" the password, and so cannot copy, forward, store, or otherwise misuse the password. Likewise, direct hardware access by non-secure executable instructions to the input unit 270, the processor 210, and/or the output unit 280 in this example is readily prevented by recording the relevant non-secure executable instructions in the prohibited instruction record 223, whereupon those non-secure executable instructions are prohibited by the second prohibitor 224.

Still with regard to FIG. 2, as has already been described the first prohibitor 222 prohibits execution of non-secure executable instructions targeting secure data entities unless those non-secure executable instructions are recorded in the permitted instruction record 221. As also described, individual non-secure executable instructions and/or groups of non-secure executable instructions may be so prohibited thereby. Prohibited groups of non-secure executable instructions may include, for example, those non-secure executable instructions that would read from or write to secure data entities. However, this feature should not be taken as an indication that all non-secure executable instructions addressing secure data entities necessarily must be or necessarily will be prohibited. In some instances, permitting execution of non-secure executable instructions that in some fashion address secure data entities may be useful, without necessarily impacting security.

Consider again the arrangement of the second example above, involving streaming media. A question may arise as to how a user might instruct the processor 210 and/or the secure supporter 225 to being streaming, and/or how to stop or control the streaming media once the processor 210 and/or the secure supporter 225 has begun streaming.

In some embodiments, the secure system manager 230, the secure supporter 225, and/or another secure data entity may be written so as to accept the user's commands (e.g. via a user interface such as the input unit 270) as secure input. However, such an arrangement opens possibilities of a user somehow entering secure commands to illegally copy, save, etc. the streaming video, while avoiding such illegal copying is an advantageous function of the present invention.

An alternative and for at least some embodiments advantageous approach is to accept user input as non-secure input 274, in this case non-secure executable instructions entered for example via the input unit 270 and handled by the non-secure data entity (e.g. an operating system or video player application), and to record suitable non-secure executable instructions in the permitted instruction record 221. As an example, a non-secure executable instruction could be recorded in the permitted instruction record 221 that would instruct the secure system manager 230 to begin downloading secure input 272.

Note that such a non-secure executable instruction does not in and of itself permit any non-secure data entity 240 to access the streaming media. The streaming media remains secure input 272 as it enters the processor 210 from the input unit 270 (e.g. a modem), is controlled if necessary by the secure supporter 225 while being processed in the processor 210, and is outputted to the output unit 280 (e.g. a display) as secure output 282. The non-secure executable instruction that initiated the sequence described immediately above is an instruction not for the non-secure data entity 240 to read from or otherwise access a secure data entity, but rather an instruction by the non-secure data entity 240 for a secure entity, e.g. the secure supporter 225, to read, download, display, etc. other secure data entities (secure input 272 from a modem and secure output 282 to a display). Given such an arrangement, secure data may be streamed, but the non-secure data entity 240 still does not "see" the data. Because the non-secure data entity 240 does not "see" the streaming media, neither the non-secure data entity 240 itself nor the user controlling the non-secure data entity 240 nor a third party (e.g. a virus) can cause the streaming media to be illegally copied, saved, redistributed, etc.

As noted with regard to FIG. 2, the permitted instruction record 221 and prohibited instruction record 223 may be instantiated on the processor 210 in some embodiments of the present invention. However, this may not be required for all embodiments.

Figure 3:
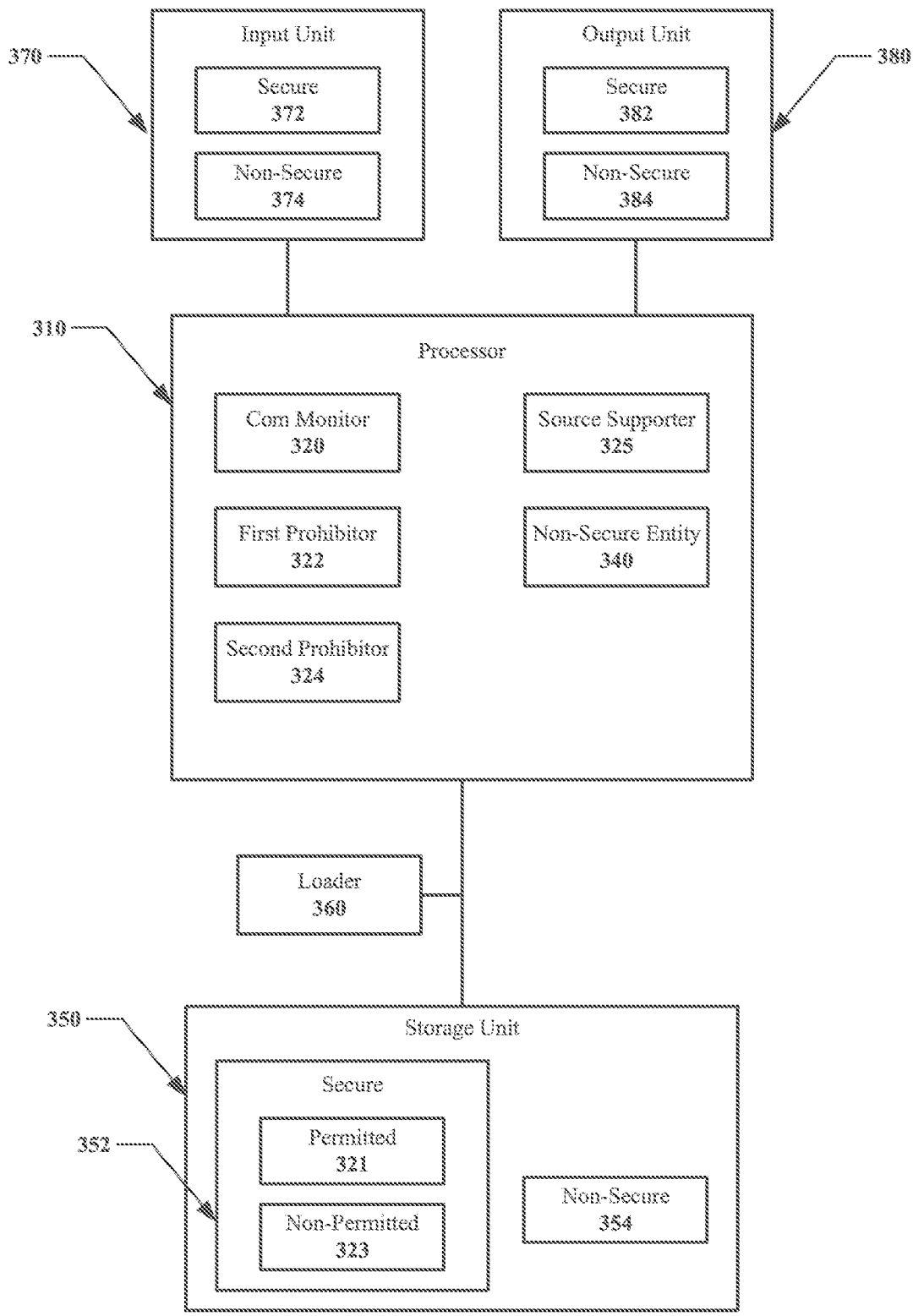
FIG. 3 shows a functional diagram of another embodiment of an apparatus in accordance with the present invention, with permitted and prohibited instruction records in a secure data store.

Referring to FIG. 3, another embodiment of the present invention is shown. The embodiment of FIG. 3 is somewhat similar to that of FIG. 2, with a processor 310, a storage unit 350, a loader 360, an input unit 370, and an output unit 380. The input unit 370 delivers secure input 372 and non-secure input 374 to the processor 310, while the output unit 380 accepts secure output 382 and non-secure output 384 from the processor 310. The processor 310 has instantiated thereon a communication monitor 320, a first prohibitor 322, a second prohibitor 324, and a secure supporter 325, all secure data entities. The processor 310 also has instantiated thereon at least one non-secure data entity 340. The storage unit 350 has disposed thereon a secure data store 352 and a non-secure data store 354.

However, while the embodiment of FIG. 2 has the permitted instruction record 221 and prohibited instruction record 223 may be instantiated on the processor 210, the embodiment of FIG. 3 is arranged differently. Therein, the permitted instruction record 321 and prohibited instruction record 323 are stored in the secure data store 352 on the storage unit 350. The permitted instruction record 321 and prohibited instruction record 323 themselves need not contain executable instructions, and need not necessarily be instantiated on the processor 310. Rather, for some embodiments it may be useful to store the permitted instruction record 321 and prohibited instruction record 323 as reference files or libraries, as shown in FIG. 3.

Figure 4:
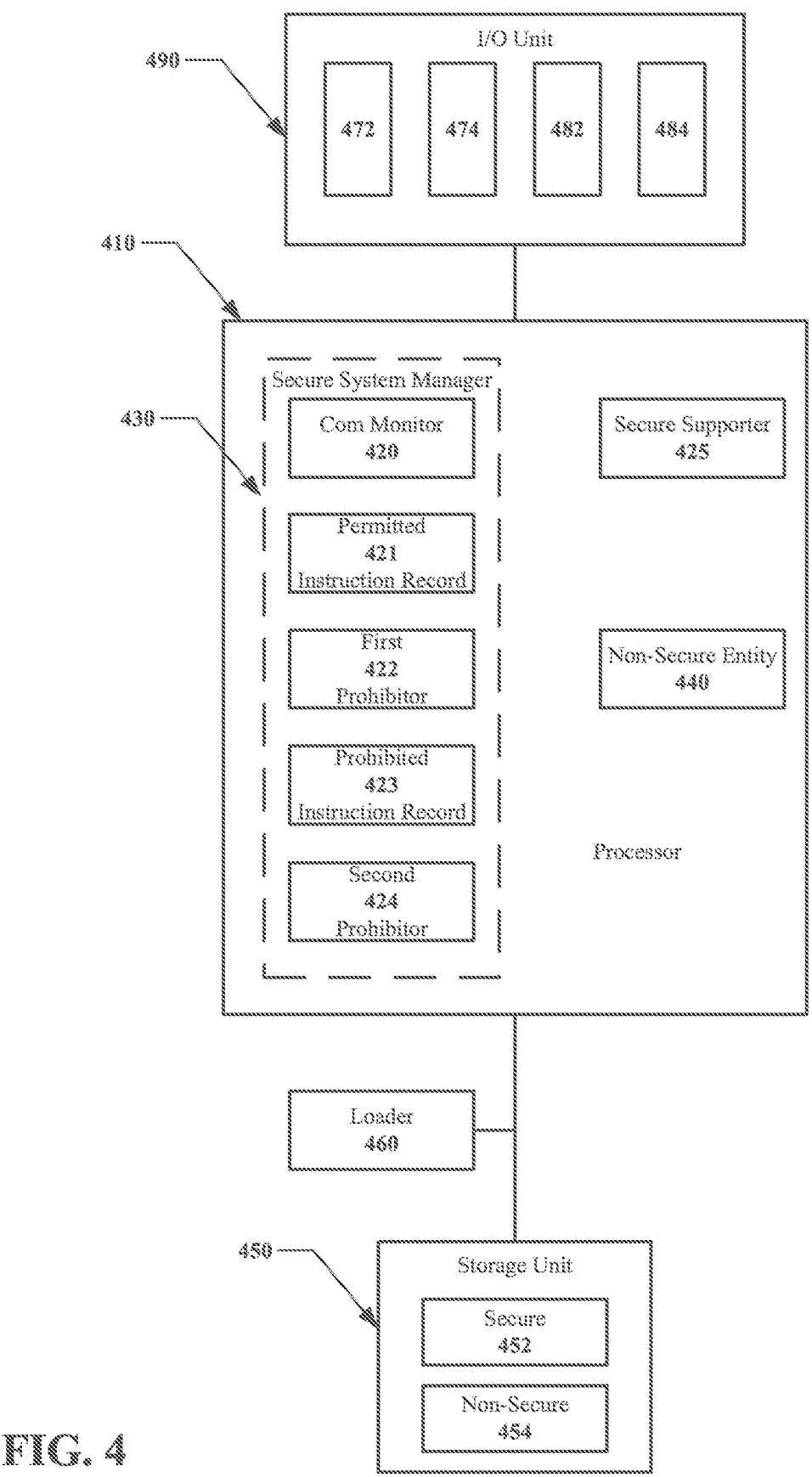
FIG. 4 shows a functional diagram of another embodiment of an apparatus in accordance with the present invention, with an input/output unit.

Turning to FIG. 4, yet another embodiment of the present invention is shown therein. The apparatus includes a processor 410, a storage unit 450, and a loader 460. The processor 410 has instantiated thereon a communication monitor 420, a permitted instruction record 421, a first prohibitor 422, a prohibited instruction record 423, a second prohibitor 424, and a secure supporter 425, all secure data entities, wherein secure data entities 420 through 424 may be considered collectively as a secure system manager 430. The processor 410 also has instantiated thereon at least one non-secure data entity 440. The storage unit 450 has thereon a secure data store 452 and a non-secure data store 454.

In addition, the embodiment shown in FIG. 4 includes a combined input/output unit 490. The input/output unit 490 delivers secure input 472 and non-secure input 474 to the processor 410, and also accepts secure output 482 and non-secure output 484 from the processor 410. While separate physical devices may be used for input and output, as shown in FIG. 2, such an arrangement is an example only, and physical devices such as the input/output unit 490 in FIG. 4 that support both input and output may be equally suitable.

In addition, although for simplicity only a single input unit 270 and output unit 280 is shown in FIG. 2, and only a single input/output unit 490 is shown in FIG. 4, embodiments with multiple input units, output units, input/output units, and/or combinations thereof may also be equally suitable.

Figure 5:
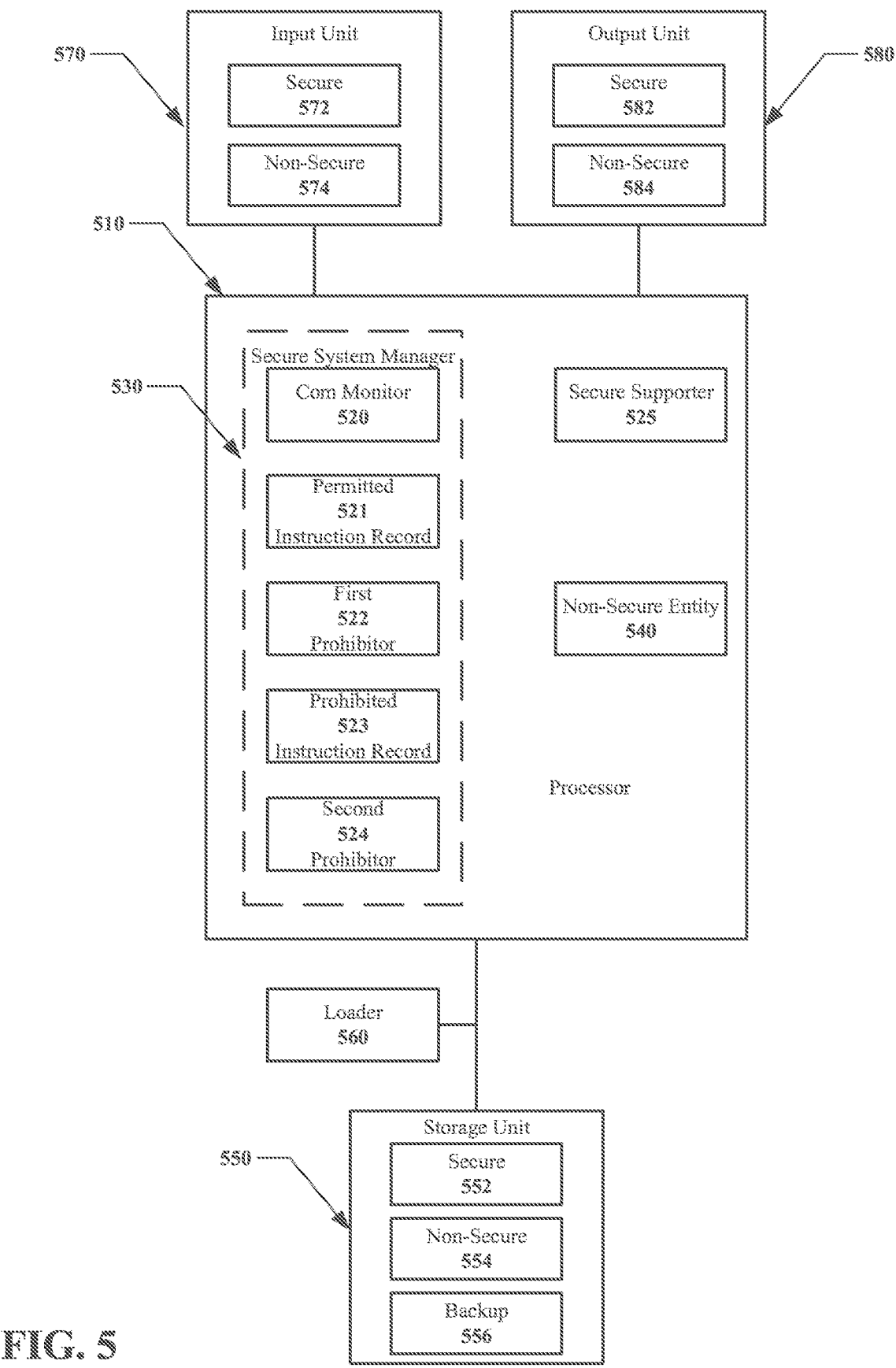
FIG. 5 shows a functional diagram of another embodiment of an apparatus in accordance with the present invention, with first and second non-secure data stores.

Referring now to FIG. 5, the security features of the secure system manager 530 also provide opportunities for backup of non-secure data, against the possibility of loss, viruses, corruption, malfunctioning new software, etc. This may be of particular value as a potential remedy in the case of severe compromise to non-secure data entities 440 such as an operating system.

The embodiment in FIG. 5 includes a processor 510, a storage unit 550, a loader 560, an input unit 570, and an output unit 580. The processor 510 has instantiated thereon a communication monitor 520, a permitted instruction record 521, a first prohibitor 522, a prohibited instruction record 523, a second prohibitor 524, and a secure supporter 525, all secure data entities, wherein secure data entities 520 through 524 may be considered collectively as a secure system manager 530. The processor 510 also has instantiated thereon at least one non-secure data entity 540. The storage unit 550 has thereon a secure data store 552 and a non-secure data store 554. The input unit 570 delivers secure input 572 and non-secure input 574 to the processor 510, while the output unit 580 accepts secure output 582 and non-secure output 584 from the processor 510.

In addition, the data storage unit 550 includes a backup data store 556 disposed thereon. The backup data store 556 may include therein copies of non-secure executable instructions and/or other non-secure data, such the stored executable instructions necessary to instantiate the non-secure data entity 540 onto the processor 510.

The features of the secure system manager 530 as previously described herein may be configured so as to protect the backup data store 556.

One such arrangement would be to include within the prohibited instruction record 523 non-secure executable instructions such that non-secure data entities 540 are prohibited by the second prohibitor 524 from writing to the backup data store 556. In the event that a non-secure data entity 540 became corrupted, was successfully attacked by a virus, etc., control of the non-secure data entity 540 still would not enable access to the backup data store 556. The backup data store 556 thus would be secure against corruption.

To support authorized access the backup data store 556, non-secure executable instructions could be recorded within the permitted instruction record 521 such that non-secure data entities 540 could call for the secure supporter 525, which in this instance might be a backup controller, to read from, write to, etc. the backup data store 556. Such an arrangement would be somewhat similar to that described above for streaming secure media: the non-secure data entity 540 itself would not have write access to the backup data store 556, but requests from the non-secure data entity 540 as specifically included in the permitted instruction record 521 could be executed by the secure supporter 525 on behalf of the non-secure data entity 540. Requests other than those specifically permitted in the permitted instruction record 521, e.g. from viruses, external attackers, etc. would be prohibited by the first prohibitor 522.

In principle, a corrupted non-secure data entity 540 might be compelled to submit a request to the secure supporter 525 to overwrite the backup data store 556. However, security measures against such events could be implemented. For example, a user password could be required before the secure supporter 525 writes to and/or overwrites the backup data store 556. Such a password could be handled as secure input 572, such that as previously described herein the non-secure data entity 540 does not "see" the password. Thus, even if corrupted the non-secure data entity 540 would not be able to enter the password on its own, without direct confirmation from the user. Other security arrangements may be equally suitable.

Figure 6:
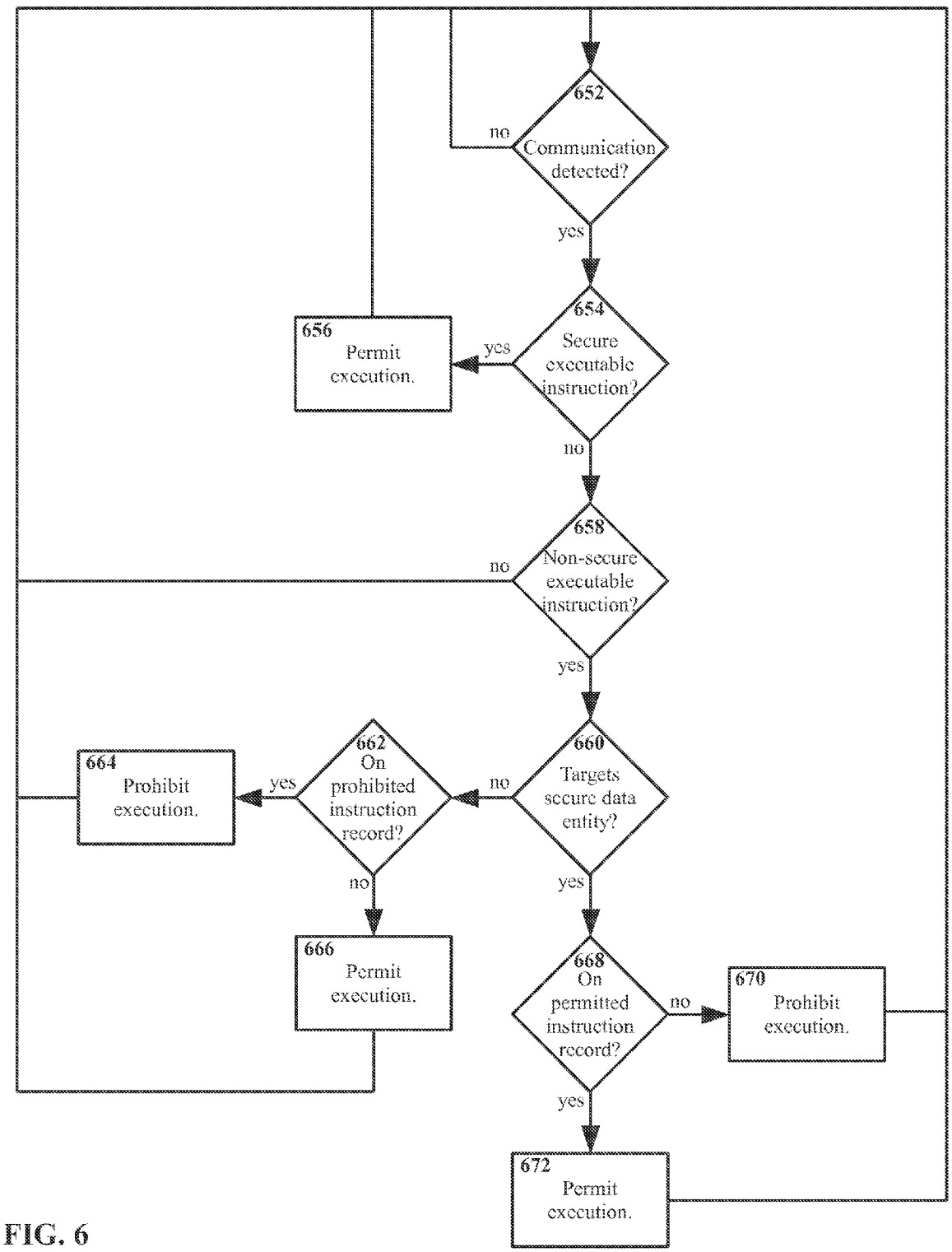
FIG. 6 shows a flowchart of a method of maintaining processing security in accordance with the present invention.

Turning to FIG. 6, an embodiment of a method in accordance with the present invention is shown therein.

In step 652, a determination is made as to whether communication, e.g. of data within a system, has been detected. If no communication is detected, no further action is taken, and the method returns again to step 652.

If communication is detected, in step 654 a determination is made as to whether the communication is a secure executable instruction. If the communication is a secure executable instruction, the method advances to step 656; step 656 permits execution of the secure executable instruction. After step 656 the method returns to step 652. If the communication is not a secure executable instruction, the method advances to step 658.

In step 658 a determination is made as to whether the communication is a non-secure executable instruction. If the communication is not a non-secure executable instruction, the method returns to step 652. (It is noted that the communication was previously determined in step 654 not to be a secure executable instruction. If the communication is neither a secure executable instruction nor a non-secure executable instruction, the communication not an executable instruction at all, and the question of permitting or prohibiting execution is moot.) If in step 658 the communication is determined to be a non-secure executable instruction, the method advances to step 660.

In step 660 a determination is made as to whether the non-secure executable instruction—the communication having been identified in step 658 to be a non-secure executable instruction—targets a secure data entity.

If the non-secure executable instruction is determined in step 660 not to target a secure data entity, the method moves on to step 662. In step 662 a determination is made as to whether the non-secure executable instruction is recorded on the prohibited instruction record. If the non-secure executable instruction is recorded on the prohibited instruction record, then execution of the non-secure executable instruction is prohibited in step 664. If the non-secure executable instruction is not recorded on the prohibited instruction record, then execution of the non-secure executable instruction is permitted in step 666. In either case, the method then returns to step 652.

Returning to step 660, if the non-secure executable instruction is determined in step 660 to target a secure data entity, the method moves on to step 668.

In step 668 a determination is made as to whether the non-secure executable instruction, the non-secure executable instruction having been determined in step 660 to target a secure data entity, is recorded on the permitted instruction record. If the non-secure executable instruction is not recorded on the permitted instruction record, then execution of the non-secure executable instruction is prohibited in step 670. If the non-secure executable instruction is recorded on the permitted instruction record, then execution of the non-secure executable instruction is permitted in step 672. In either case, the method then returns to step 652.

Figure 7A:
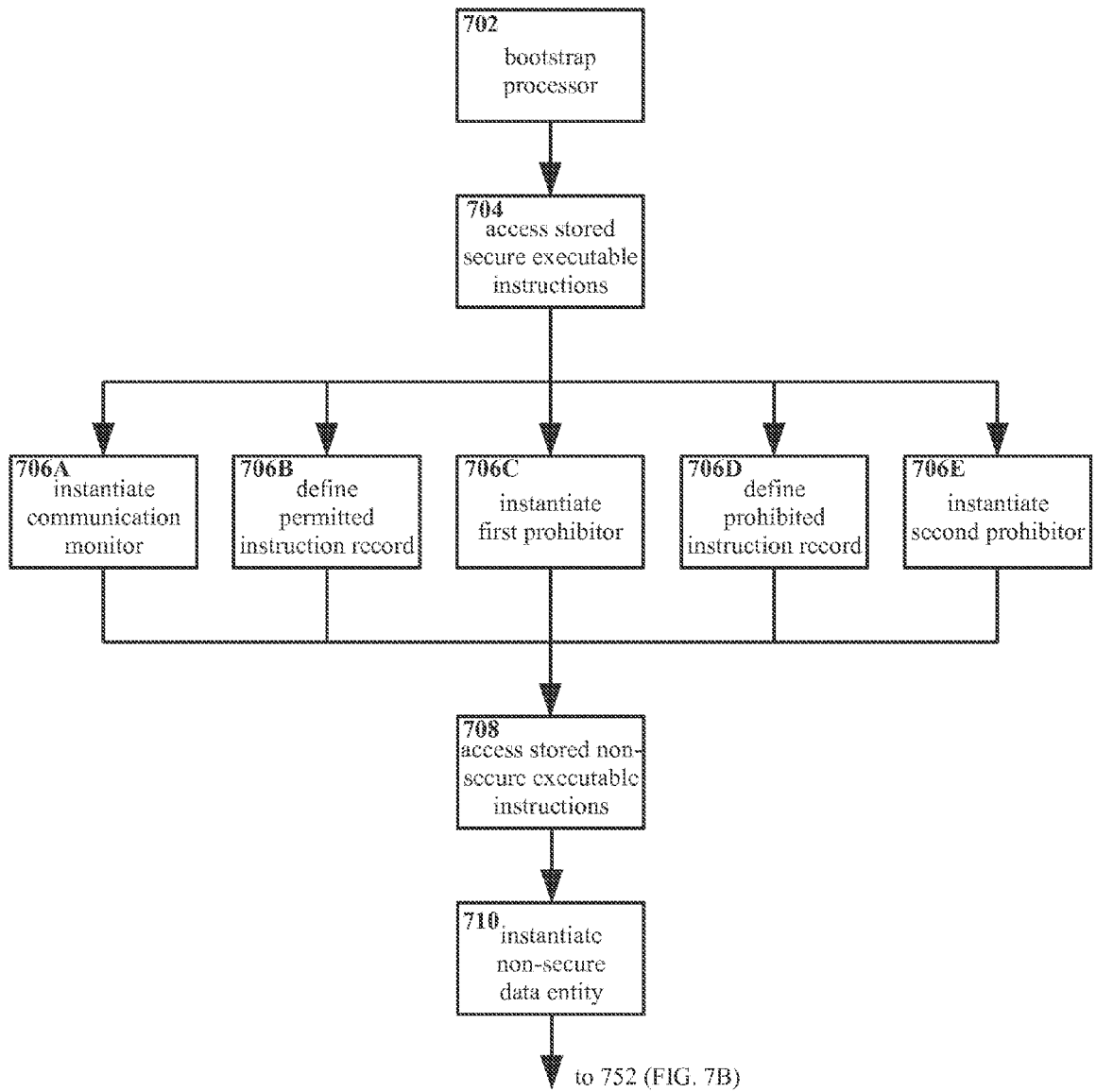
FIG. 7A and FIG. 7B show a flowchart of a method of establishing and maintaining processing security in accordance with the present invention.
Figure 7B:
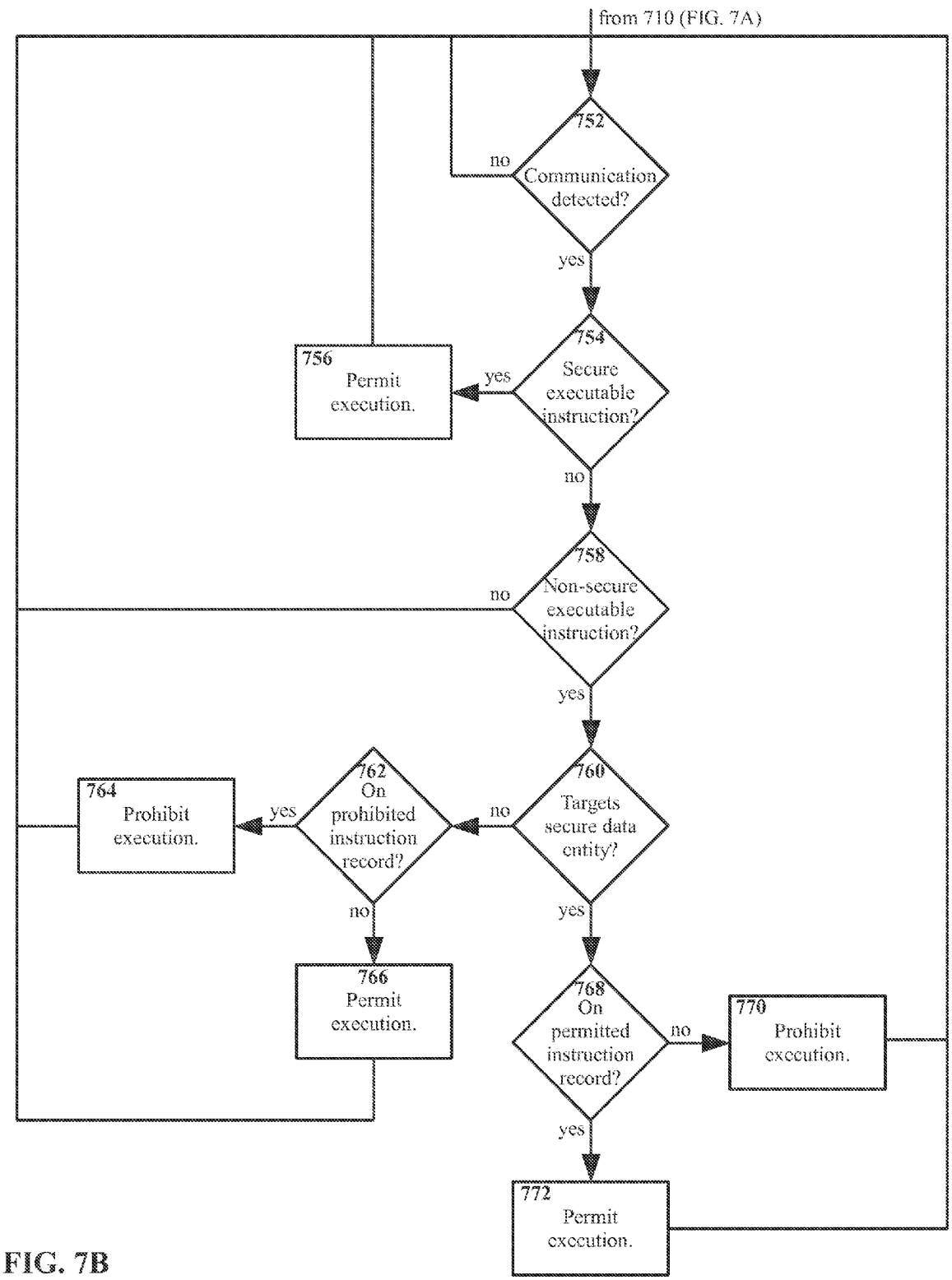

In FIG. 7A and FIG. 7B, another embodiment of a method in accordance with the present invention is shown. Whereas the embodiment of FIG. 6 addresses identifying and permitting or prohibiting execution of executable instructions, FIG. 7A and FIG. 7B also address establishing suitable elements for carrying out similar actions (that is, for identifying and permitting or prohibiting executable instructions).

As shown in FIG. 7A, in step 702 a processor is bootstrapped. That is to say, a data processing system is brought into a functional state. The particulars of this step will vary depending on conditions; for an arrangement utilizing a digital processing unit, bootstrapping may be executed by activating hardware-related procedures, which in turn support and/or activate firmware, which brings the processor into a condition where the processor may accept and/or load software (e.g. executable instructions). However, such an arrangement is an example only, and the present invention is not particularly limited with regard to either the processor or the bootstrapping process.

Once step 702 is complete, the processor accesses stored secure executable instructions in step 704. Using the stored secure executable instructions accessed in step 704, several tasks are performed, identified as steps 706A, 706B, 706C, 706D, and 706E. Step 706A instantiates a communication monitor on the processor; step 706B accesses a permitted instruction record; step 706C instantiates a first prohibitor on the processor; step 706D accesses a prohibited instruction record; step 706E instantiates a second prohibitor on the processor. Steps 706A, 706B, 706C, 706D, and 706E may be performed sequentially, in parallel, or some combination thereof; the ordering of the steps 706A, 706B, 706C, 706D, and 706E with respect to one another is not particularly limited.

Having been instantiated and/or accessed in steps 706A, 706B, 706C, 706D, and 706E using stored secure executable instructions accessed in step 704, the communication monitor, permitted instruction record, first prohibitor, prohibited instruction record, and second prohibitor are considered to be secure data entities.

With steps steps 706A, 706B, 706C, 706D, and 706E complete, and thus with the communication monitor, first prohibitor, and second prohibitor instantiated and the permitted and prohibited instruction records accessed, the method advances to step 708.

In step 708, the processor accesses stored non-secure executable instructions. Using the stored non-secure executable instructions accessed in step 708, at least one non-secure data entity is instantiated on the processor in step 710.

Referring next to FIG. 7B, in step 752 a determination is made by the communication monitor (instantiated previously in step 706A) as to whether communication, e.g. of data within a system, has been detected. If the communication monitor detects no communication, no further action is taken, and the method returns again to step 752.

If communication is detected, in step 754 a determination is made as to whether the communication is a secure executable instruction. In some embodiments the determination of step 754 may be made by the communication monitor but other arrangements, including but not limited to the determination being made by the first or second prohibitor (instantiated previously in steps 706C and 706E respectively) or by some combination thereof, may be equally suitable. If the communication is a secure executable instruction, the method advances to step 756; step 756 permits execution of the secure executable instruction. After step 756 the method returns to step 752. If the communication is not a secure executable instruction, the method advances to step 758.

In step 758 a determination is made as to whether the communication is a non-secure executable instruction. In some embodiments the determination of step 758 may be made by the communication monitor but other arrangements, including but not limited to the determination being made by the first or second prohibitor or by some combination thereof, may be equally suitable. If the communication is not a non-secure executable instruction, the method returns to step 752. (It is noted that the communication was previously determined in step 754 not to be a secure executable instruction. If the communication is neither a secure executable instruction nor a non-secure executable instruction, the communication not an executable instruction at all, and the question of permitting or prohibiting execution is moot.) If in step 758 the communication is determined to be a non-secure executable instruction, the method advances to step 760.

In step 760 a determination is made as to whether the non-secure executable instruction—the communication having been identified in step 758 to be a non-secure executable instruction—targets a secure data entity. In some embodiments the determination of step 760 may be made by the communication monitor but other arrangements, including but not limited to the determination being made by the first or second prohibitor or by some combination thereof, may be equally suitable.

If the non-secure executable instruction is determined in step 760 not to target a secure data entity, the method moves on to step 762. In step 762 a determination is made as to whether the non-secure executable instruction is recorded on the prohibited instruction record. In some embodiments this determination may be made by the second prohibitor but other arrangements, including but not limited to the determination being made by the communication monitor or the first prohibitor or by some combination thereof, may be equally suitable. If the non-secure executable instruction is recorded on the prohibited instruction record, then execution of the non-secure executable instruction is prohibited in step 764 by the second prohibitor. If the non-secure executable instruction is not recorded on the prohibited instruction record, then execution of the non-secure executable instruction is permitted in step 766 by the second prohibitor. In either case, the method then returns to step 752.

Returning to step 760, if the non-secure executable instruction is determined in step 760 to target a secure data entity, the method moves on to step 768.

In step 768 a determination is made as to whether the non-secure executable instruction, the non-secure executable instruction having been determined in step 760 to target a secure data entity, is recorded on the permitted instruction record. In some embodiments this determination may be made by the first prohibitor but other arrangements, including but not limited to the determination being made by the communication monitor or the second prohibitor or by some combination thereof, may be equally suitable. If the non-secure executable instruction is not recorded on the permitted instruction record, then execution of the non-secure executable instruction is prohibited in step 770 by the first prohibitor. If the non-secure executable instruction is recorded on the permitted instruction record, then execution of the non-secure executable instruction is permitted in step 772 by the first prohibitor. In either case, the method then returns to step 752.

Figure 8A:
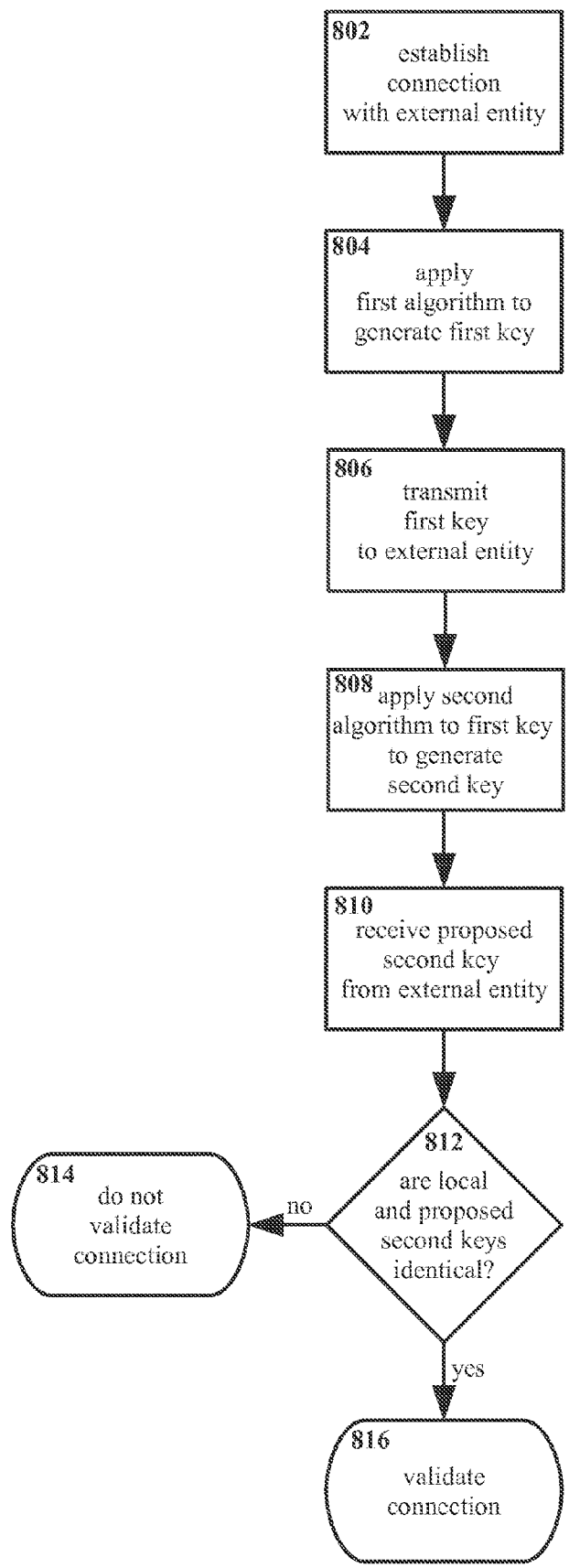
FIG. 8A and FIG. 8B show a flowchart of a method of validating a connection between local and external entities.
Figure 8B:
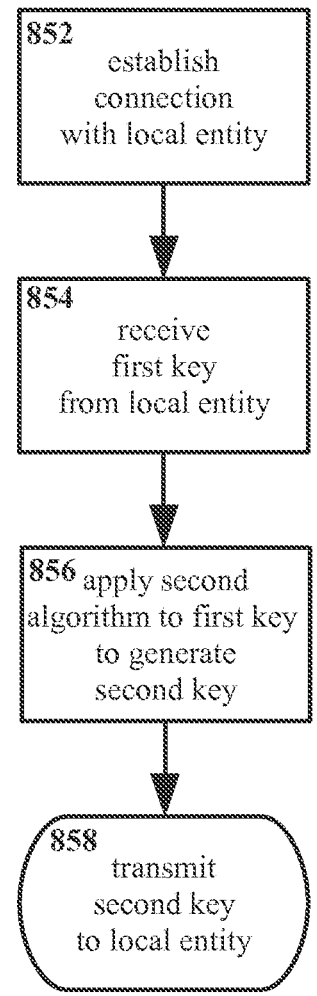

Moving on to FIGS. 8A and 8B, as previously noted the security features of the present invention may be most effective if the hardware and/or the software are controlled.

In particular, for certain embodiments it may be useful to validate potential external sources for secure executable instructions. External sources of secure executable instructions represent a potential avenue for upgrades to the secure system manager, new and/or improved secure data entities, etc. However, as the secure system manager does not typically prohibit execution of secure executable instructions, executable instructions from non-secure sources masquerading as secure also represent a potential opportunity to attack the security of the system. It is therefore advantageous not only to maintain control of sources and distribution channels for secure executable instructions, but also to provide for validation of those sources and distribution channels.

Similarly, for certain embodiments it may be useful to validate sources of secure input, and/or to control destinations for secure output.

One arrangement for validating as secure a connection between an apparatus according to the present invention utilizes key generation. FIG. 8A and FIG. 8B illustrate an arrangement of steps therein for such validation.

FIG. 8A shows an arrangement of steps to be performed in a local entity, e.g. a processor with a secure system manager instantiated thereon.

In step 802, a connection is established for communication with an external entity, such as a source for potentially receiving secure executable instructions.

In step 804 the local entity generates a first key using a first algorithm. Typically the first key is generated by a secure data entity, but first key generation is not otherwise particularly limited. The secure data entity generating the first key may be the secure system manager or some component thereof, or may be some other secure data entity.

In step 806 the local entity transmits the first key to the external entity. It is noted that the first algorithm is not necessarily transmitted with the first key.

In step 808 the local entity also generates a second key using a second algorithm applied to the first key. Typically the second key is generated by a secure data entity, but second key generation is not otherwise particularly limited. The secure data entity generating the second key may be the secure system manager or some component thereof, or may be some other secure data entity.

In step 810, the local entity receives a proposed second key from the external entity. The locally generated second key and the proposed second key received from the external entity are compared in step 812. If the local and proposed second keys are not identical, the local entity does not validate the connection in step 814. However, if the local and proposed second keys are identical, the local entity validates the connection in step 816.

Turning to FIG. 8B, a corresponding arrangement of steps to be performed in the external entity are shown.

In step 852, a connection is established for communication between the external entity and the local entity.

In step 854, the external entity receives the first key from the local entity.

In step 856 the external entity, which also has the second algorithm, applies the second algorithm to the first key received from the local entity in step 854, thereby producing a proposed second key. Because both the local entity and the external entity have the same second algorithm, so long as the first key is received correctly from the local entity, the proposed second key generated in step 856 should be identical to the second key generated locally (in step 808 shown in FIG. 8A).

In step 858 the external entity transmits the second key back to the local entity for comparison.

FIG. 8A and FIG. 8B show both sides of a one-directional verification between a local entity and an external entity. However, for additional security, it is also possible to reverse roles and repeat the method. That is, the external entity would follow steps similar to those of FIG. 8A while the local entity would follow steps similar to those of FIG. 8B. Given such an arrangement, the local entity and the external entity would cooperate to validate the connection in both directions.

The keys and algorithms for validation are not particularly limited, but it is preferable that the keys and algorithms be sufficiently complex as to make simulating the keys and algorithms successfully a difficult task for a third party. In addition, it is preferable to keep the keys and/or the algorithms secret, at least for algorithms wherein knowledge of the keys and/or algorithms would simplify the task of simulating those keys and algorithms successfully.

Also, for some embodiments it may be desirable for the first key to be unique to each connection. That is, each time a connection is established, a new first key is used.

In addition, for some embodiments it may be useful to use keys and/or algorithms that depend on and/or incorporate local information, such as a unique serial number of a processor or other element, the current time, etc. Such an arrangement can help increase the difficulty of "spoofing", that is, portraying an invalid device as a valid device.

Likewise, for some embodiments it may be desirable for the keys and algorithms to be selected such that determining the algorithms that generate the keys from the keys themselves is sufficiently complex as to make doing so a difficult task for a third party. Since the keys are transmitted, they could potentially be intercepted; if the algorithms can be readily determined from the keys, or by examining many such keys from many restarts, this might represent a potential avenue for attacking the security system.

However, the validation approach and the variations described herein are examples only. Other arrangements may be equally suitable.

Figure 9:
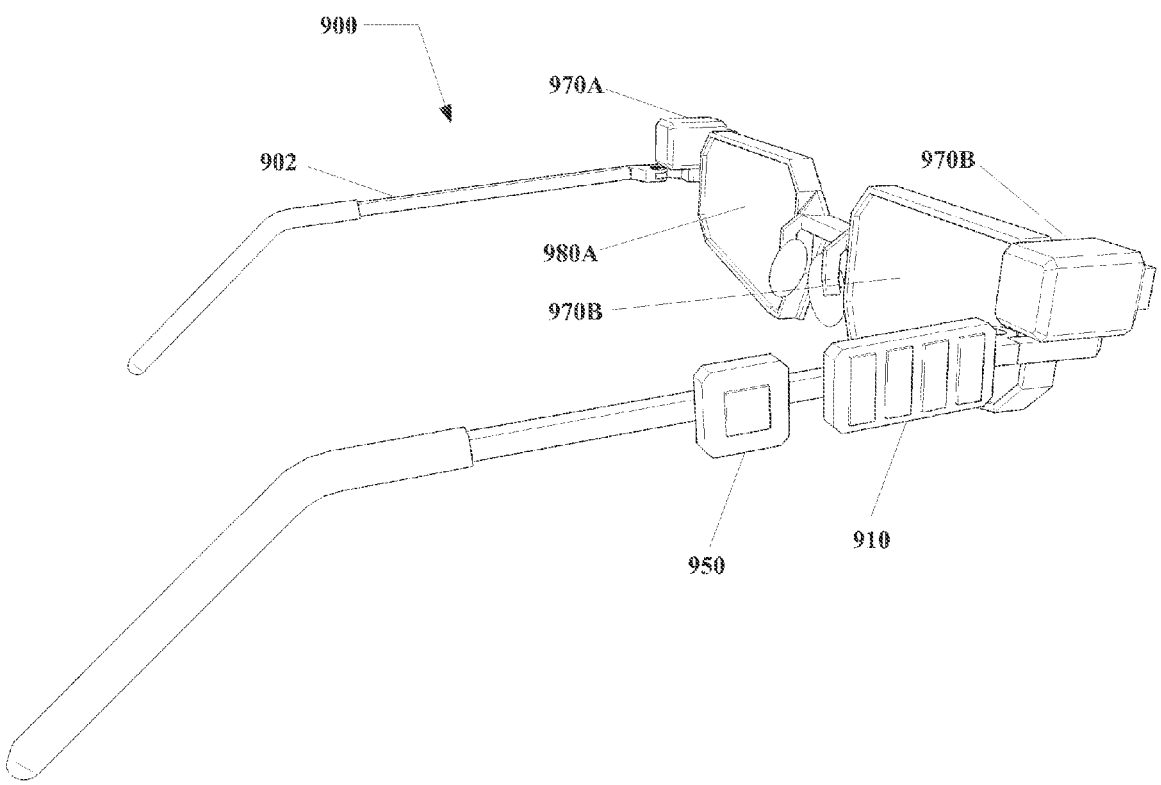
FIG. 9 shows a head mounted display in accordance with the present invention.

Turning to FIG. 9, the apparatus and its components are not particularly limited in terms of physical form, and/or in terms of where or how that physical form may be disposed. However, for certain embodiments it may be suitable for the apparatus to be incorporated into a portable media device. Likewise, it may be suitable for the apparatus to be incorporated into a wearable media device. In particular, it may be suitable for the apparatus to be incorporated into a head mounted display, such as virtual/augmented reality goggles, glasses, etc. Such an arrangement is shown in FIG. 9.

FIG. 9 shows an embodiment of the present invention in the form of a head mounted display apparatus 900. The apparatus 900 is generally arranged so as to be wearable by a user, as illustred incorporating a body 902 configured as a pair of glasses or goggles. The apparatus 900 includes a processor 910, and a data storage unit 950. As illustrated, the processor 910 is shown as a digital data processor, and the data storage unit 950 is shown as a solid state drive. The apparatus also includes input units 970A and 970, herein illustrated in the form of digital cameras. The apparatus further includes output units 980A and 980B, herein illustrated in the form of visual display screens. The configuration of the body 902 is such that when worn by a user, the output units 980A and 980B are disposed proximate and substantially in front of the user's eyes.

When the apparatus 900 is active, the apparatus 900 would have a number of data entities thereon. For a digital processing system as illustrated, such data entities lack physical substance, and so are not visible in FIG. 9. However, while the apparatus 900 is active processor 910 has instantiated thereon secure data entities and at least one non-secure data entity as previously described. The data storage unit 950 stores therein at least a secure and a non-secure data store, with secure and non-secure executable instructions for instantiating secure and non-secure data entities onto the processor 910 stored therein. The input units 970A and 970B are adapted to receive secure and non-secure input, while the output units 980A and 980B are adapted to deliver secure and non-secure output.

However, it is emphasized that the use of the present invention in a head mounted display, and particularly in a head mounted display as shown in FIG. 9, is an example only. Other arrangements, including but not limited to other head mounted displays, other portable devices, and non-portable devices, may be equally suitable.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. A secure processing apparatus comprising:
a hardware processor, the hardware processor including a non-secure data entity and a secure data entity, the non-secure data entity providing non-secure executable instructions;
a communication monitor that works in cooperation with the hardware processor to detect communication between the secure data entity and the non-secure data entity, the communication monitor including secure executable instructions;
a first prohibitor that works in cooperation with the hardware processor to prohibit execution of the non-secure executable instructions on the secure data entity unless the non-secure executable instructions are recorded in a permitted instruction record;
a second prohibitor that works in cooperation with the hardware processor to prohibit execution of the non-secure executable instructions on the secure data entity if the non-secure executable instructions are recorded in a prohibited instruction record; and
a loader that works in cooperation with the hardware processor to instantiate the communication monitor, the permitted instruction record, the first prohibitor, the prohibited instruction record, and the second prohibitor on the hardware processor from the secure executable instructions, and to instantiate the non-secure data entity from the non-secure executable instructions.

2. A head mounted display comprising:
a body adapted to be worn on a user's head;
a processor associated with the body, the processor including a non-secure data entity and a plurality of secure data entities;
an input unit associated with the body and in communication with the processor to receive at least one of secure data or non-secure data as input;
an output unit associated with the body and in communication with the processor, the output unit including at least one graphical display disposed proximate at least one of the user's eyes, the output unit to display at least one of secure data or non-secure data;
a non-secure data store and a secure data store disposed on a data storage unit associated with the body, the non-secure data store containing non-secure executable instructions stored therein, the secure data store including secure executable instructions stored therein, wherein the non-secure executable instructions are provided by the non-secure data entity based on the input;
a communication monitor that works in co-operation with the processor to detect communication among the secure data entities and the non-secure data entity;
a first prohibitor instantiated on said processor to prohibit execution of the non-secure executable instructions on the secure data entities unless the non-secure executable instructions are recorded in a permitted instruction record; and
a second prohibitor instantiated on the processor to prohibit execution of the non-secure executable instructions on the secure data entities if the non-secure executable instructions are recorded in a prohibited instruction record.

3. A method, comprising:
instantiating at least one non-secure data entity on a processor, the instantiating including instantiating a non-secure program containing non-secure executable instructions; and
instantiating a plurality of secure data entities on the processor, the instantiating including:
instantiating a communication monitor to detect a communication among any of the secure data entities and the at least one non-secure data entity, the communication monitor including secure executable instructions,
instantiating a first prohibitor, the first prohibitor prohibiting execution of said non-secure executable instructions unless said non-secure executable instructions are recorded in a permitted instruction record, the prohibiting the execution including prohibiting execution of only those of the non-secure executable instructions that affect the secure data entities, and
instantiating a second prohibitor, the second prohibitor prohibiting execution of said non-secure executable instructions if said non-secure executable instructions are recorded in a prohibited instruction record, the prohibiting the execution including prohibiting execution of the non-secure executable instructions regardless of whether the non-secure executable instructions affect the secure data entities.

4. The method of claim 3, wherein the permitted instruction record excludes all said non-secure executable instructions for said non-secure data entities reading from or writing to said secure data entities, such that said first prohibitor prohibits execution of all said non-secure executable instructions for said non-secure data entities reading from or writing to said secure data entities.

5. The method of claim 3, wherein instantiating a first prohibitor further includes:
recording in the permitted instruction record at least one non-secure executable instruction for at least one of said secure data entities reading from or writing to said secure data entities, such that said first prohibitor permits execution of said at least one non-secure executable instruction for said at least one of said secure data entities reading from or writing to said secure data entities.

6. The method of claim 3, wherein instantiating said secure data entities includes:
providing a secure data store, said secure data store comprising secure executable instructions stored thereon, and
providing a loader, said loader instantiating said communication monitor, said first prohibitor, and said second prohibitor on said processor from said secure executable instructions stored in said secure data store.

7. The method of claim 6, wherein instantiating said at least one non-secure data entity further includes:
providing a non-secure data store, said non-secure data store comprising non-secure executable instructions stored thereon, said loader instantiating said non-secure program on said processor from said non-secure executable instructions stored in said non-secure date store.

8. The method of claim 6, wherein said loader instantiates at least said communication monitor, said first prohibitor, and said second prohibitor before instantiating any of said at least one non-secure data entities.

9. The method of claim 6, further comprising:
disposing at least one of said permitted instruction record and said prohibited instruction record on said secure data store.

10. The method of claim 3, wherein instantiating said secure data entities further comprises:

establishing a connection with an external entity, said connection being at least one of a source of input to said processor and a destination of output from said processor; and validating said connection, so as to define input from said connection as secure input and to define output to said connection as secure output, said secure input and secure output being secure data entities.

11. The method of claim 10, wherein the validating said connection comprises:

in said processor, generating a first key using a first algorithm;

in said processor, generating a second key using a second algorithm and said first key;

transmitting said first key to said external entity;

at said external entity, generating said second key using said second algorithm and said first key;

transmitting said second key to said processor;

comparing said second key generated in said processor against said second key generated at said external entity; and determining said connection to be valid if said second key generated in said processor and said second key generated at said external entity are identical.

12. The method of claim 11 further comprising:

generating said first key using information associated with at least one of the group consisting of said secure data entities, said processor, and an apparatus comprising said processor.

13. The method of claim 11 further comprising:

generating a new first key each time said connection is established, said new first key being different from a previous first key.

14. The method of claim 3, wherein instantiating said secure data entities further includes providing a secure input to said processor.

15. The method of claim 14, wherein instantiating said secure data entities includes providing said secure input to said processor from an external entity via a data receiver.

16. The method of claim 14, wherein said secure input includes at least one of streaming media, a password, and secure executable instructions.

17. The method of claim 14, wherein instantiating said secure data entities includes a user providing said secure input to said processor via a user interface.

18. The method of claim 3, wherein instantiating said secure data entities further includes said processor generating a secure output.

19. The method of claim 18, wherein instantiating said secure data entities includes said processor delivering said secure output to an external entity via a data transmitter.

20. The method of claim 18, wherein said secure output includes at least one of streaming media, a password, and secure executable instructions.

* * * * *